US010272273B2

(12) United States Patent
Townsend et al.

(10) Patent No.: US 10,272,273 B2
(45) Date of Patent: Apr. 30, 2019

(54) FLUID ADAPTER AND FLUID COUPLING

(71) Applicant: Draeger Safety UK Limited, Blyth, Northumberland (GB)

(72) Inventors: Paul Nicholas Townsend, Cramlington (GB); Ross Alexander Clubb MacLeod, Morpeth (GB)

(73) Assignee: DRAEGER SAFETY UK LIMITED, Blyth, Northumberland (GB)

( * ) Notice: Subject to any disclaimer, the term of this patent is extended or adjusted under 35 U.S.C. 154(b) by 828 days.

(21) Appl. No.: 14/771,992

(22) PCT Filed: Feb. 26, 2014

(86) PCT No.: PCT/GB2014/050578
§ 371 (c)(1),
(2) Date: Sep. 1, 2015

(87) PCT Pub. No.: WO2014/132058
PCT Pub. Date: Sep. 4, 2014

(65) Prior Publication Data
US 2016/0016018 A1 Jan. 21, 2016

(30) Foreign Application Priority Data

Mar. 1, 2013 (GB) .................................. 1303731.2
Mar. 1, 2013 (GB) .................................. 1303732.0
Mar. 1, 2013 (GB) .................................. 1303733.8

(51) Int. Cl.
*A62B 7/02* (2006.01)
*A62B 7/12* (2006.01)
(Continued)

(52) U.S. Cl.
CPC .................. *A62B 9/04* (2013.01); *A62B 7/02* (2013.01); *A62B 7/12* (2013.01); *A62B 9/02* (2013.01);
(Continued)

(58) Field of Classification Search
CPC .......... A61M 16/20–16/209; A62B 7/00–7/04; A62B 7/12; A62B 9/02–9/027
See application file for complete search history.

(56) References Cited

U.S. PATENT DOCUMENTS 2,459,643 A 1/1949 Hartley et al.
3,717,147 A 2/1973 Flynn
(Continued)

FOREIGN PATENT DOCUMENTS

EP 0567956 11/1993
EP 0663220 7/1995
(Continued)

OTHER PUBLICATIONS

Search report dated Jul. 12, 2013, from corresponding GB Application No. 1303733.8.
(Continued)

*Primary Examiner* — Jennifer M Deichl
(74) *Attorney, Agent, or Firm* — DLA Piper LLP (US)

(57) ABSTRACT

There is disclosed a fluid adapter for a breathable gas delivery device, such as a facemask, for delivering breathable gas to a user. The fluid adapter comprises an adapter body defining an adapter chamber; a pressurized gas inlet port in fluid communication with the adapter chamber and arranged to be fluidically coupled to a source of pressurized breathable gas and an ambient air inlet port arranged to provide fluid communication between the adapter chamber and ambient air outside of the fluid adapter. The adapter also comprises an adapter outlet port in fluid communication with the adapter chamber and arranged to be fluidically coupled to a delivery device gas inlet port of the breathable gas delivery device; and an adapter connector arranged to connect the fluid adapter to the breathable gas delivery (Continued)

device such that the adapter outlet port is fluidically coupled to the delivery device gas inlet port.

19 Claims, 23 Drawing Sheets

(51) Int. Cl.
| | |
|---|---|
| *A62B 9/02* | (2006.01) |
| *A62B 9/04* | (2006.01) |
| *F16K 3/02* | (2006.01) |
| *G05D 7/01* | (2006.01) |
| *A62B 17/00* | (2006.01) |
| *A62B 17/04* | (2006.01) |
| *A62B 18/02* | (2006.01) |
| *F16L 15/04* | (2006.01) |
| *F16L 29/00* | (2006.01) |
| *F16L 37/02* | (2006.01) |
| *F16L 37/08* | (2006.01) |
| *F16L 37/28* | (2006.01) |
| *F16L 55/07* | (2006.01) |
| *G05D 16/04* | (2006.01) |

(52) U.S. Cl.
CPC ............ *F16K 3/0227* (2013.01); *F16L 15/04* (2013.01); *F16L 29/007* (2013.01); *F16L 37/02* (2013.01); *F16L 37/08* (2013.01); *F16L 37/28* (2013.01); *F16L 55/07* (2013.01); *G05D 7/01* (2013.01); *G05D 16/04* (2013.01); *A62B 9/022* (2013.01); *A62B 17/006* (2013.01); *A62B 17/04* (2013.01); *A62B 18/02* (2013.01)

(56) References Cited

U.S. PATENT DOCUMENTS

| | | | |
|---|---|---|---|
| 4,686,976 A | 8/1987 | Bakkila | |
| 4,899,740 A | 2/1990 | Napolitano | |
| 5,357,951 A * | 10/1994 | Ratner | A61M 16/208 |
| | | | 128/205.12 |
| 6,394,088 B1 * | 5/2002 | Frye | A61M 16/20 |
| | | | 128/204.26 |
| 6,634,357 B1 | 10/2003 | Hamilton | |
| 7,051,731 B1 | 5/2006 | Rogerson | |
| 2002/0026942 A1 * | 3/2002 | Eswarappa | A62B 7/10 |
| | | | 128/205.27 |
| 2002/0131326 A1 | 9/2002 | Greiling | |
| 2005/0115566 A1 | 6/2005 | Van Den Akker | |
| 2007/0235030 A1 * | 10/2007 | Teetzel | A62B 7/10 |
| | | | 128/205.12 |
| 2008/0017200 A1 | 1/2008 | Carepa et al. | |
| 2013/0331692 A1 | 12/2013 | Mouri | |

FOREIGN PATENT DOCUMENTS

| | | |
|---|---|---|
| EP | 1685877 | 8/2006 |
| GB | 940581 | 10/1963 |
| GB | 2171770 | 1/1985 |
| GB | 2158909 | 9/1986 |
| GB | 2400014 | 10/2004 |
| IE | 970302 | 11/1998 |
| JP | 10-080488 | 8/1999 |
| JP | 2009-079636 | 4/2009 |
| WO | 01/97914 | 12/2001 |
| WO | 2004/022903 | 3/2004 |
| WO | 2004/093997 | 11/2004 |
| WO | 2010/022363 | 2/2010 |
| WO | 2012/114633 | 8/2012 |

OTHER PUBLICATIONS

Search report dated Jul. 24, 2013, from corresponding GB Application No. 1303732.0.
Search report dated Nov. 18, 2013, from corresponding GB Application No. 1303732.0.
Search report dated Jul. 24, 2013, from corresponding GB Application No. 1303731.2.
Search report dated Aug. 28, 2014, from corresponding GB Application No. 1403397.1.
Search report dated Aug. 29, 2014, from corresponding GB Application No. 1403396.3.
Premaire supplied respiratory system, http://www.msaconstructor.com.catalog/product732.html.
International Search Report and Written Opinion from PCT/GB2014/050578.

* cited by examiner

FLUID ADAPTER AND FLUID COUPLING

BACKGROUND

The invention relates to a fluid adapter for a breathable gas delivery device, such as a facemask, for delivering breathable gas to a user.

When working in an environment in which the atmosphere is either contaminated or otherwise unsuitable for breathing it is necessary to use breathing apparatus. One option is to use self-contained breathing apparatus (SCBA) which typically comprises a cylinder of breathable gas that is carried by the user. Whilst this may be suitable for some applications, the equipment worn by the user may be bulky and may therefore restrict the activities that the user can carry out, and the size of the cylinder that the user can carry may not contain enough breathable gas for a suitable working duration.

It is therefore known for the breathable gas to be supplied to the wearer from a large cylinder that is either static or moveable on a trolley, or from a breathable gas airline installed within the building. The breathable gas is typically delivered to the user through a facemask or hood or protection suit that is fluidically connected to the source of breathable gas, such as a tank or airline, with a flexible conduit. The breathable gas may be supplied on demand, by using a lung demand valve for example, or may be supplied constantly.

If a constant flow breathable gas delivery device is used, such as a mask or hood, it may be desirable for the user to be able to inhale ambient air if possible so as to preserve the source of breathable gas; only using it when necessary. It may therefore desirable to provide an arrangement capable of achieving this both simply and effectively.

SUMMARY OF THE INVENTION

An exemplary embodiment of the present invention comprises a fluid adapter for a breathable gas delivery device for delivering breathable gas to a user, the breathable gas delivery device having a delivery device gas inlet port having a coupling, the fluid adapter comprising an adapter body defining an adapter chamber with at least one fluid passageway extending through the adapter body into the adapter chamber; an ambient air inlet port arranged to provide fluid communication between the adapter chamber and ambient air outside of the fluid adapter; an adapter outlet port formed by the adapter body and in fluid communication with the adapter chamber, the adapter outlet port having a coupling formed by the adapter body, wherein the coupling is arranged to cooperate with the coupling of the gas inlet port of a breathable gas delivery device such that the adapter outlet port is fluidically coupled to the delivery device gas inlet port and such that the fluid adapter is physically coupled to the breathable gas delivery device; a one-way valve disposed within the adapter body between the ambient air inlet port and the adapter chamber, wherein the one-way valve is arranged so as to permit fluid flow into the adapter chamber through the ambient air inlet port but restrict or prevent fluid flow out of the adapter chamber through the ambient air inlet port; a rotatable part comprising: an annular member; and a pressurised gas inlet port arranged to be fluidically coupled to a source of pressurised breathable gas; wherein the rotatable part is rotatably coupled to the adapter body with the annular member surrounding the adapter body such that the rotatable part can be rotated to a plurality of discrete angular positions which are defined by an indexing feature; and wherein in each of the discrete angular positions the pressurised gas inlet port is in fluid communication with the adapter chamber through the at least one fluid passageway.

Another exemplary embodiment of the present invention comprises a fluid adapter for a breathable gas delivery device for delivering breathable gas to a user, the fluid adapter comprising an adapter body defining an adapter chamber with at least one fluid passageway extending through the adapter body into the adapter chamber; an ambient air inlet port arranged to provide fluid communication between the adapter chamber and ambient air outside of the fluid adapter; an adapter outlet port in fluid communication with the adapter chamber and arranged to be fluidically coupled to a delivery device gas inlet port of the breathable gas delivery device; an adapter connector arranged to connect the fluid adapter to the breathable gas delivery device such that the adapter outlet port is fluidically coupled to the delivery device gas inlet port; and a rotatable part comprising an annular member and a pressurised gas inlet port arranged to be fluidically coupled to a source of pressurised breathable gas, the rotatable part being rotatably coupled to the adapter body with the annular member surrounding the adapter body such that the rotatable part can be rotated to a plurality of angular positions with respect to the adapter body so as to alter the position of the pressurised gas inlet port, wherein in each of the angular positions the pressurised gas inlet port is in fluid communication with the adapter chamber through the at least one fluid passageway.

BRIEF DESCRIPTION OF THE DRAWINGS

Embodiments of the invention will now be described, by way of example, with reference to the accompanying drawings, in which.

DETAILED DESCRIPTION

Figure 1:
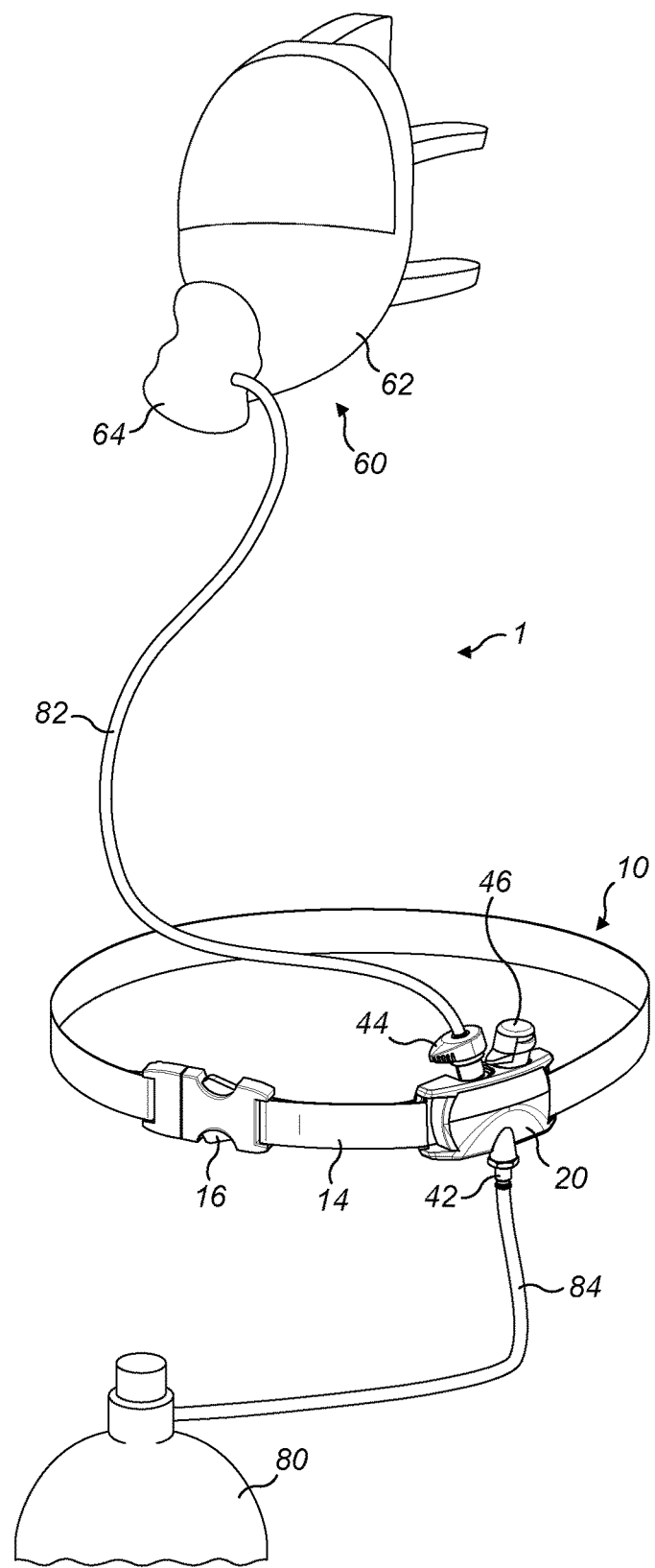
FIG. 1 schematically shows a compressed airline breathing apparatus including a waist mountable manifold.

According to an aspect of the invention there is provided a fluid adapter for a breathable gas delivery device, such as a facemask, hood or protection suit, for delivering breathable gas to a user, the fluid adapter comprising: an adapter body defining an adapter chamber; a pressurised gas inlet port in fluid communication with the adapter chamber and arranged to be fluidically coupled to a source of pressurised breathable gas; an ambient air inlet port arranged to provide fluid communication between the adapter chamber and ambient air outside of the fluid adapter; an adapter outlet port in fluid communication with the adapter chamber and arranged to be fluidically coupled to a delivery device gas inlet port of the breathable gas delivery device; and an adapter connector arranged to connect the fluid adapter to the breathable gas delivery device such that the adapter outlet port is fluidically coupled to the delivery device gas inlet port. The adapter may allow either ambient air or pressurised breathable gas to be supplied to the user. The adapter may be particularly suitable for constant flow breathing apparatus in which pressurised breathable gas is continuously supplied to a user from a source of breathable gas such as a cylinder, tank, compressor or compressed air network (or ring main) installed in a building.

The pressurised gas inlet port may be provided with a pressurised gas connector for fluidically and/or physically connecting a flexible conduit for supplying pressurised breathable gas to the pressurised gas inlet port.

The fluid adapter may further comprise a valve disposed between the ambient air inlet port and the adapter chamber. This may mean that the valve is disposed between, and separates, the ambient air inlet port from both the pressurised gas inlet and the adapter outlet port. The valve may be a one-way valve arranged so as to permit fluid flow into the adapter chamber through the ambient air inlet port but restrict or prevent fluid flow out of the adapter chamber through the ambient air inlet port. The valve may be a diaphragm one-way valve. The valve may prevent pressurised breathable gas supplied through the pressurised gas inlet port from exiting the adapter chamber through the ambient air inlet port. When pressurised breathable gas is supplied through the pressurised air inlet port, this may close the valve thereby preventing ambient air from being inhaled into the adapter chamber through the ambient air inlet port.

The fluid adapter may further comprise a filter disposed between the ambient air inlet port and the adapter chamber. The filter may be disposed between the ambient air inlet port and both the pressurised gas inlet port and the adapter outlet port. The filter may be arranged to filter ambient air inhaled through the ambient air inlet port. The filter may be disposed between the ambient air inlet port and the valve.

The fluid adapter may further comprise a blanking plug that is located or is arranged to be located within the ambient air inlet port so as to prevent fluid flow through the ambient air inlet port. When located within the ambient air inlet port this may seal the ambient air inlet port preventing ambient air from being inhaled through the ambient air inlet port. The blanking plug may be threadedly engaged with, or arranged to be threadedly engaged with the ambient air inlet port. Alternatively the blanking plug may be arranged for a push or snap fit.

The fluid adapter may further comprise an excess flow valve which is arranged to open and close in response to the pressure within the adapter chamber so as to vent exhaled air, or gas, within the adapter chamber to the atmosphere. When pressurised breathable gas is supplied through the pressurised gas inlet port, if the flow rate is in excess of that which is required by the user, the excess gas can exit to the atmosphere through the excess flow valve. The excess flow valve may be a one-way valve so that it does not permit ambient air from entering the adapter chamber. The fluid adapter may further comprise an excess flow passageway extending through the adapter body into the adapter chamber, wherein the excess flow valve is arranged to control the flow of exhaled air, or gas, through the excess flow passageway. The excess flow valve may be resiliently biased to a closed position and may be arranged to move to an open position when the pressure within the adapter chamber is above a threshold. The excess flow valve may open when the user exhales as the pressure within the adapter chamber increases. The excess flow valve may be a one-way diaphragm valve or a sleeve valve.

The adapter connector may comprise a threaded adapter outlet port, a snap-fit adapter outlet port or a press-fit adapter outlet port.

At least one fluid passageway may extending through the adapter body into the adapter chamber. The adapter body may have a generally cylindrical outer wall portion through which at least one fluid passageway extends into the adapter chamber. There may be multiple fluid passageways circumferentially distributed about the body or cylindrical outer wall portion at substantially the same axial position. The body or generally cylindrical outer wall portion may have a stepped profile of various diameters or may be of a constant diameter. The fluid adapter may further comprise a rotatable part comprising an annular member and the pressurised gas inlet port. The pressurised gas inlet port may extend from the annular member in a direction having a radial component. The rotatable part may be rotatably coupled to the adapter body with the annular member surrounding the adapter body, such as the cylindrical outer wall portion of the adapter body, and with the pressurised gas inlet port in fluid communication with the adapter chamber through the at least one fluid passageway. The annular member may be sealed to the body or cylindrical outer wall portion axially either side of the at least one fluid passageway. The rotatable part may be rotatable to a plurality of angular positions with respect to the adapter body so as to alter the position of the pressurised gas inlet port. In each of the angular positions the pressurised gas inlet port may be in fluid communication with the adapter chamber. The pressurised gas inlet port may be in fluid communication with the adapter chamber regardless of the angular position of the rotatable part. Alternatively, the pressurised gas inlet port may only be in fluid communication with the adapter chamber when it is in one of a set number of angular positions.

The fluid adapter may further comprise an indexing feature defining a plurality of discrete angular positions to which the rotatable part can be rotated with respect to the adapter body. There may be at least two, at least four, at least six, at least eight, or at least ten discrete angular positions. The indexing feature may be integrally formed with the rotatable part and the adapter body. The indexing feature may comprise a plurality of circumferentially spaced first formations formed on either the adapter body or the rotatable part and at least one corresponding second formation formed on the other of the adapter body and the rotatable part. The number of second formations may be the same as the number of first formations and may be spaced in the same way. Alternatively, there may be a single second formation and multiple first formations. In one arrangement there are multiple first and second formations that are both evenly circumferentially spaced with the number of first formations an integer multiple of the number of second formations. The first and/or second formations may be evenly circumferentially distributed. First and second formations may be arranged to engage with one another at each of the plurality discrete angular positions. The first formations may comprise recesses or projections and the at least one second formation may comprise the other of recesses or projections. The circumferential spacing of the first formations may define the plurality of discrete angular positions. First formations may be formed on either the adapter body, such as the outer surface of the cylindrical outer wall portion of the adapter body, or the inner surface of the annular member. The at least one second formation may be formed on the other of the outer surface of the cylindrical outer wall portion and the inner surface of the annular member. The adapter body, or the cylindrical outer wall portion of the adapter body, or the annular member may be resiliently deformable. This may allow the first and second formations to engage, and be disengaged by relative rotation. The indexing feature may inhibit the movement of the rotatable part away from a particular discrete angular position. Movement of the rotatable part away from a particular angular position may be achieved by applying a sufficient rotation force between the adapter body and the rotatable part.

The adapter may further comprise an annular fluid channel between the adapter body and the annular member into which the pressurised gas inlet port and the at least one fluid passageway opens so as to ensure fluid communication between the pressurised gas inlet port and the adapter chamber regardless of the angular position of the rotatable part. The inner surface of the annular member and/or the outer surface of the cylindrical outer wall portion may be provided with an annular fluid channel into which the pressurised gas inlet port or the at least one fluid passageway opens. The annular fluid channel may be aligned, such as axially aligned, so as to ensure fluid communication between the pressurised gas inlet port and the adapter chamber regardless of the angular position of the rotatable part. If there are multiple fluid passageways they may all be aligned with the annular fluid channel.

The fluid adapter may further comprise a sealing arrangement sealing between the adapter body and the annular member. The sealing arrangement may comprise first and second seals disposed either side of the at least one fluid passageway. The sealing arrangement may comprise at least one lip seal having a lip portion which seals against a sealing surface formed by either the adapter body or the annular member. The lip seal may comprise a main ring portion integrally formed with the lip portion. The lip seal may be annular. The lip seal may be mounted to the adapter body or the annular member. The lip portion may extend between the adapter body and the annular member. The lip portion may be resiliently deformable. The lip portion may extend in a direction inclined to the radial direction. The lip portion may extend in a direction that is inclined away from the at least one fluid passageway. The lip portion may be inclined in a direction away from the pressure side of the adapter chamber. The lip seal may be configured such that a pressure within the adapter chamber above a threshold causes the lip portion to resiliently deflect away from the sealing surface, thereby allowing gas within the adapter chamber to be vented out of the adapter chamber. The lip seal may therefore provide the functionality of an excess flow or pressure relief valve.

The invention also relates to breathing apparatus equipment, comprising: a breathable gas delivery device for delivering breathable gas to a user and having a delivery device gas inlet port; and a fluid adapter in accordance with any statement herein; wherein the adapter connector connects the fluid adapter to the breathable gas delivery device such that the adapter outlet port is fluidically coupled to the delivery device gas inlet port. The breathable gas delivery device may be a facemask or a hood or a protection suit.

The invention also relates to breathing apparatus, comprising: a manifold having a manifold inlet port for a source of breathable gas and at least one manifold outlet port; a strap arranged to be worn by the user; a holder coupled to the strap and to which the manifold is attached; breathing apparatus equipment in accordance with any statement herein with a first flexible conduit fluidically coupled between the pressurised gas inlet port and the manifold outlet port; and a source of pressurised breathable gas with a second flexible conduit fluidically coupled between the pressurised source of breathable gas and the manifold inlet port. The source of breathable gas may be a tank, a cylinder, a compressor or a compressed air network (or ring main) installed within a building.

According to an aspect of the invention there is provided a fluid coupling, comprising: a body defining a fluid chamber at least one fluid passageway extending through the body into the fluid chamber; a rotatable part comprising an annular member and a moveable fluid port, the rotatable part being rotatably coupled to the body with the annular member surrounding the body; and an indexing feature defining a plurality of discrete angular positions to which the rotatable part can be rotated with respect to the body so as to alter the position of the moveable fluid port, wherein in each of the angular positions the moveable fluid port is in fluid communication with the fluid chamber. The body may have a generally cylindrical outer wall portion through which the at least on fluid passageway extends. The annular member may surround the cylindrical outer wall portion with the moveable fluid port in fluid communication with the fluid chamber through the at least one fluid passageway. There may be at least two, at least four, at least six, at least eight, or at least ten discrete angular positions. The indexing feature may be integrally formed with the rotatable part and the adapter body.

There may be multiple fluid passageways circumferentially distributed about the body or cylindrical outer wall portion at substantially the same axial position. The body or generally cylindrical outer wall portion may have a stepped profile of various diameters or may be of a constant diameter. The fluid port may extend from the annular member in a direction having a radial component. The annular member may be sealed to the body or cylindrical outer wall portion axially either side of the at least one fluid passageway. The fluid port may be in fluid communication with the adapter chamber regardless of the angular position of the rotatable part. Alternatively, the fluid port may only be in fluid communication with the adapter chamber when it is in one of a set number of angular positions.

The indexing feature may comprise a plurality of circumferentially spaced first formations formed on either the body or the rotatable part and at least one corresponding second formation formed on the other of the body and the rotatable part. The number of second formations may be the same as the number of first formations and may be spaced in the same way. Alternatively, there may be a single second formation and multiple first formations. In one arrangement there are multiple first and second formations that are both evenly circumferentially spaced with the number of first formations an integer multiple of the number of second formations. The first and/or second formations may be evenly circumferentially distributed. First and second formations may be arranged to engage with one another at each of the plurality discrete angular positions. The first formations may comprise recesses or projections and the at least one second formation comprises the other of recesses or projections. The circumferential spacing of the first formations may define the plurality of discrete angular positions. First formations may be formed on either the outer surface of the body, such as the cylindrical outer wall portion of the body, or the inner surface of the annular member. The at least one second formation may be formed on the other of the outer surface of the body, such as the cylindrical outer wall portion of the body, and the inner surface of the annular member. The body, such as the cylindrical outer wall portion of the body, or the annular member may be resiliently deformable. This may allow the first and second formations to engage, and be disengaged by relative rotation. The indexing feature may inhibit the movement of the rotatable part away from a particular discrete angular position. Movement of the rotatable part away from a particular angular position may be achieved by applying a sufficient rotation force between the adapter body and the rotatable part.

The fluid coupling may further comprise an annular fluid channel between the body and the annular member into which the fluid port and the at least one fluid passageway opens so as to ensure fluid communication between the fluid port and the fluid chamber regardless of the angular position of the rotatable part. The inner surface of the annular member and/or the outer surface of the body, such as the cylindrical outer wall portion of the body, may be provided with an annular fluid channel into which the fluid port or the at least one fluid passageway opens. The annular fluid channel may be aligned, such as axially aligned, so as to ensure fluid communication between the fluid port and the fluid chamber regardless of the angular position of the rotatable part. If there are multiple fluid passageways they may all be aligned with the annular fluid channel.

The fluid coupling may further comprise a sealing arrangement sealing between the body and the annular member. The sealing arrangement may comprise first and second seals disposed either side of the at least one fluid passageway. The sealing arrangement may comprise at least one lip seal having a lip portion which seals against a sealing surface formed by either the body or the annular member. The lip seal may comprise a main ring portion integrally formed with the lip portion. The lip seal may be annular. The lip seal may be mounted to the body or the annular member. The lip portion may extend between the body and the annular member. The lip portion may be resiliently deformable. The lip portion may extend in a direction inclined to the radial direction. The lip portion may extend in a direction that is inclined away from the at least one fluid passageway. The lip portion may be inclined in a direction away from the pressure side of the fluid chamber. The lip seal may be configured such that a pressure within the fluid chamber above a threshold causes the lip portion to resiliently deflect away from the sealing surface, thereby allowing gas within the fluid chamber to be vented out of the adapter chamber. The lip seal may therefore provide the functionality of a pressure relief valve.

The moveable fluid port may be an input port for supplying fluid to the fluid chamber or an output port for delivering fluid from the fluid chamber. The body may comprise a fluid coupling inlet port and a fluid coupling outlet port at opposing ends.

The invention also relates to a manifold having a manifold inlet port for a source of breathable gas and at least one manifold outlet port for delivering breathable gas to a user, the manifold comprising at least one fluid coupling in accordance with any statement herein, wherein the manifold inlet port comprises a fluid coupling inlet port and/or wherein the manifold outlet port comprises the fluid coupling outlet port.

The invention also relates to breathing apparatus equipment comprising the fluid coupling in accordance with any statement herein or a manifold in accordance with any statement herein.

According to an aspect of the invention there is provided a valve assembly for controlling the supply of breathable gas to a user, comprising: a valve assembly inlet port for a source of breathable gas; a valve assembly outlet port for delivering breathable gas to a user; a pressure reduction valve disposed between the valve assembly inlet port and the valve assembly outlet port and configured to reduce the pressure of breathable gas supplied at the valve assembly inlet port in use; and a flow control valve disposed between the pressure reduction valve and the valve assembly outlet port and having a flow adjuster which in use can be used to adjust the gas flow rate of the breathable gas delivered from the valve assembly outlet port. The valve assembly may be referred to as an integrated flow control and reducer valve. The valve assembly may be particularly suitable for constant flow breathing apparatus in which breathable gas is continuously supplied to a user from a source of breathable gas such as a cylinder, tank, compressor or compressed air network (or ring main) installed in a building.

The pressure reduction valve may be arranged to reduce the pressure to 10 bar or less, 8 bar or less, 6 bar or less, 4 bar or less, or 2.5 bar or less. The flow control valve may be capable of adjusting the flow rate between 0-600 l/min, 50-500 l/min, 100-400 l/min, or 170-350 l/min.

The flow control valve and the pressure reduction valve may be separate valves. In other words, the flow control valve and pressure reduction valves may be separate mechanical assemblies which may or may not be disposed in a single housing.

The valve assembly may be configured such that the gas flow rate of the breathable gas delivered from the valve assembly outlet port is substantially independent of the pressure of the breathable gas supplied at the valve assembly inlet port. The flow rate may be independent of supply pressure over a range. The range may be within 0-20 bar, 0.5-18 bar, 1-16 bar, 1.5-14 bar, 2-14 bar, 2.5-12 bar, or 2.8-10 bar. If the valve assembly is used with constant flow breathing apparatus, this may mean that the flow rate of the breathable gas supplied to the user does not change as the supply pressure of the breathable gas changes. During the use of breathing apparatus, the supply pressure of the source of breathable gas may reduce as more users connect to the same source of breathable gas, or as the source of breathable gas is depleted. The valve assembly may be configured such that the in use the flow adjuster can be used to adjust the flow rate without substantially changing the pressure of the breathable gas delivered from the valve assembly outlet port.

The flow adjuster may comprise a rotatable knob. This may be easily adjustable by the user.

The flow control valve may comprise at least one flow passageway for breathable gas, the size of which can be adjusted in use by the flow adjuster so as to adjust the gas flow rate of the breathable gas delivered from the valve assembly outlet port. There may be multiple separate flow passageways, or a single passageway. If there are multiple flow passageways, each one may be of a variable size, or one or more may be fixed and one or more may be variable. The at least one flow passageway may have a minimum size so as to ensure that in use the gas flow rate of the breathable gas delivered from the valve assembly outlet port is kept above a minimum. If there is a single passageway it may have a minimum size to which it can be reduced, if there are multiple passageways one may be fixed open and one may be variable between fully open and fully closed. As will be appreciated, other alternatives are possible.

The flow control valve may comprise a first member, such as a plate or tube, having a first orifice opening and a second adjacent member, such as a plate or tube, having a second orifice opening, wherein in use the flow adjuster may be used to move one of the members relative to the other member so as to vary the degree of alignment of the first and second orifice openings, thereby adjusting the size of an orifice passageway defined by the first and second orifice openings and hence the gas flow rate of the breathable gas delivered from the valve assembly outlet port. The first and/or second member may be rotatable or slidable, for example. The flow adjuster may be coupled to the first or second member. The first member may be a first plate and the second member may be a second plate. The first and second plates may be parallel and in contact with each other. One of the members may be fixed and the other may be moveable by the flow adjuster. For example, the first plate may be rotatable and the second plate may be fixed.

The flow control valve may comprise a bypass passageway having a minimum size so as to ensure that in use the gas flow rate of the breathable gas delivered from the valve assembly outlet port is kept above a minimum. The minimum may be at least 50 l/min, 100 l/min, 150 l/min, or 170 l/min. The first and second members may comprise first and second bypass openings that in use are always aligned to at least some degree regardless of the relative position of the first and second members. The valve assembly may be arranged such that the flow adjuster can be used to rotate one of the members about a rotational axis with respect to the other member so as to vary the degree of alignment of the first and second openings. The first and second bypass openings may be coaxial with one another and the rotational axis. The degree of alignment of the first and second bypass openings may be fixed so that the size of the bypass passageway is fixed. If the members are plates such as discs, the bypass openings may extend through the centre of the discs such that they are coaxial.

The pressure reduction valve may comprise a pressure chamber downstream of a valve seat and a corresponding valve member. The pressure chamber may be upstream of the flow control valve. The valve member may be resiliently biased away from the valve seat to an open position in which breathable gas supplied at the valve assembly inlet port can flow into the chamber. The valve member may be resiliently biased by any suitable means such as a spring or a mass of resilient material. In use, breathable gas in the pressure chamber may act against the bias to move the valve member towards a closed position. The valve member may be coupled to a piston slidably disposed within the pressure chamber and upon which in use breathable gas in the pressure chamber acts to move the valve member towards a closed position. The valve member may be attached to the piston by a piston shaft. A fluid passageway may extend from the valve member through the piston and piston shaft and open into the pressure chamber. The tip of the piston shaft may form the valve member.

The pressure reduction valve and the flow control valve may be at least partially disposed within a common housing. The pressure reduction valve and flow control valve may be sealed within a common housing. The flow adjuster may be disposed outside of the housing so that it can be easily adjusted. The valve assembly inlet port may be the pressure reduction valve inlet, the pressure reduction valve outlet may be in direct fluid communication with the flow control valve inlet and the flow control valve outlet may be the valve assembly outlet port. The valve assembly inlet and outlet ports may be formed in a housing and may be formed in opposing ends of a housing. The valve assembly inlet port may be a threaded inlet port or a push-fit inlet port and similarly the valve assembly outlet may be a threaded outlet port or a push-fit outlet port.

The invention also relates to breathing apparatus equipment, comprising: a manifold having a manifold inlet port for a source of breathable gas and at least one manifold outlet port; a valve assembly in accordance with any statement herein, wherein the valve assembly inlet port is fluidically connected to the manifold outlet port. The manifold may be arranged to be attached to a the user. The valve assembly may be connected to the manifold for controlling the supply of breathable gas to the user. The equipment may further comprise a strap arranged to be worn by the user; and a holder coupled to the strap and to which the manifold is attached.

The invention also relates to breathing apparatus, comprising: breathing apparatus equipment in accordance with any statement herein; a breathable gas delivery device for delivering breathable gas to a user with a first flexible conduit fluidically coupled between the breathable gas delivery device and the valve assembly outlet port; and a source of breathable gas with a second flexible conduit fluidically coupled between the source of breathable gas and the manifold inlet port. The breathable gas delivery device may be a facemask or a hood or a protection suit. The source of breathable gas may be a tank, a cylinder, a compressor or a compressed air network (or ring main) installed within a building.

According to an aspect of the invention there is provided breathing apparatus equipment, such as a waist mountable manifold, comprising: a manifold having a manifold inlet port for a source of breathable gas and at least one manifold outlet port for delivering breathable gas to a user; a strap, such as a waist belt, arranged to be worn by the user; and a holder coupled to the strap and having a socket which is configured such that the manifold can be removably located within the socket in multiple orientations. This may result in a versatile piece of equipment which may be configured by the particular user. For example, if the breathing apparatus equipment is a waist mountable manifold, the user may easily change the equipment from being suitable for wearing on their left side, to being suitable for wearing on their right side. This may be achieved by removing the manifold from the socket, and relocating it in the same socket in a different orientation.

The manifold may be removably located within the socket in one of the multiple orientations.

At least part of the socket may have a shape corresponding to the external profile, or at least a substantial part of the external profile, of the manifold. This allows the manifold to be located within the socket, although part of the manifold, such as any fittings or fluid ports, may project from the socket.

The holder may be arranged to protectively enclose the manifold within the socket. Thus, when the manifold is located within the socket the holder may protect it from damage.

The shape of the socket may be symmetrical. This may allow the manifold to be located within the socket in multiple orientations. The socket may be Y-shaped, such as a symmetrical Y-shape. If the manifold is also a symmetrical Y-shape, the manifold can be located within the socket in first and second orientations that are essentially mirror images of each other. Of course, it should be appreciated that shapes other than Y-shape could be used. For example, the socket and/or manifold could be X-shaped.

The socket may be provided in the rear side of the holder such that in use the socket faces the user. This may mean that when the manifold is located within the socket, in use, the manifold is between the holder and user, thereby protecting the manifold from being removed from the holder.

The equipment may further comprise retaining means configured to retain the manifold within the socket. The socket may comprises the retaining means. The retaining means may be resilient such that the manifold snap-fits into the socket.

The external profile of the manifold, or at least a substantial part of the external profile of the manifold, may be symmetrical. The external profile of the manifold may be Y-shaped, particularly, a symmetrical Y-shape. As explained above, other shapes could be used, for example an X-shape. If the manifold is Y-shaped having three branches, the lower branch may comprise the manifold inlet port for a source of breathable gas, and the upper two branches may each comprise a manifold outlet port, at least one of them being a manifold outlet port for delivering breathable gas to a user.

The front side of the holder may have a curved profile. The holder may be integrally formed. The holder may be formed from a plastics material, but other suitable materials may be used.

The holder may be slidably coupled to the strap such that it can slide along at least a part of the length of the strap. The strap may extend across the socket and/or may extend across the rear side of the holder. The strap may be a waist belt, or a shoulder strap, or a bandolier-style strap. The strap may be continuous. The strap may be provided with length adjustment means and/or a buckle allowing it to be fastened around a user.

The invention also relates to breathing apparatus comprising: breathing apparatus equipment in accordance with any statement herein; a breathable gas delivery device for delivering breathable gas to a user with a first flexible conduit fluidically coupled between the breathable gas delivery device and a manifold outlet port; and a source of breathable gas with a second flexible conduit fluidically coupled between the source of breathable gas and the manifold inlet port.

The breathable gas delivery device may be a facemask, a hood or a protection suit. The source of breathable gas may be a tank, a cylinder, a compressor or a compressed air network (or ring main) installed within a building.

The breathing apparatus may further comprise a clip fitted to the first flexible conduit for securing the conduit to the user, for example securing to a garment worn by the user.

The invention may comprise any combination of the features and/or limitations referred to herein, except combinations of such features as are mutually exclusive.

FIG. 1 shows compressed airline breathing apparatus 1 comprising breathing apparatus equipment, in the form of a waist mountable manifold 10, a breathable gas delivery device 60, comprising a facemask 62 and a lung demand valve (LDV) 64, and a source of breathable gas, which in this embodiment is a cylinder of compressed air 80. As will be described in detail below, the waist mountable manifold 10 comprises a holder 20 attached to a waist belt 14; the holder 20 holding a manifold 40 having a manifold inlet port 42 and first and second manifold outlet ports 44, 46. The manifold inlet port 42 of the manifold 40 is fluidically coupled to the cylinder of compressed air 80 with a first flexible hose 82 and one of the manifold outlet ports 44 of the manifold 40 is fluidically coupled to the LDV 64 with a second flexible hose 84. In use, the waist mountable manifold 10 is worn around a user's waist and the facemask 62 is donned allowing the user to breathe clean air supplied from the cylinder 80.

Figure 2:
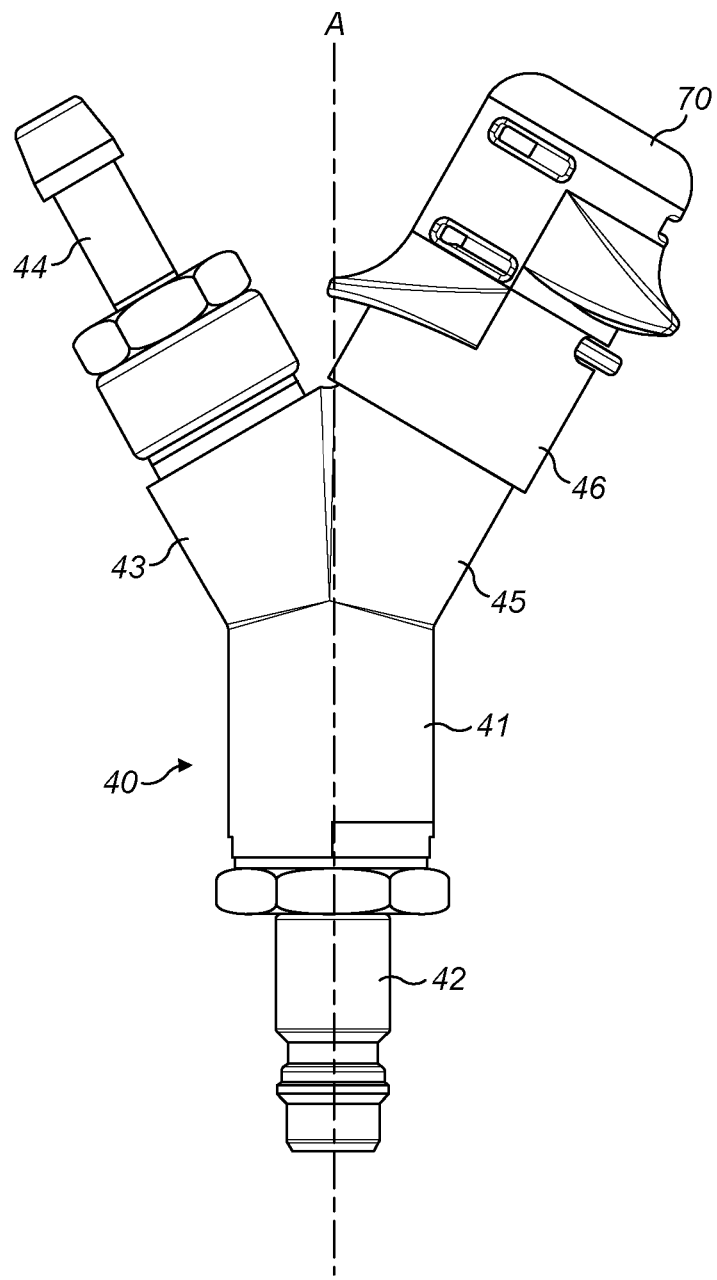
FIG. 2 schematically shows the manifold of the waist mountable manifold of FIG. 1.

FIG. 2 shows the manifold 40 of the waist mountable manifold 10. The manifold 40 is essentially a fluid connector for receiving and distributing breathable gas. The manifold 40 is substantially a symmetrical Y-shape having a lower branch 41 and first and second upper branches 43, 45. The manifold 40 is substantially symmetrical about an axis A which extends through the centre of the lower branch 42. The lower branch 41 is provided with a manifold inlet port 42 which is threadedly attached to the lower branch 41, and the first and second upper branches 43, 45 are provided with first and second manifold outlet ports 44, 46. The manifold inlet port 42 is for fluidically connecting the manifold 40 to a source of breathable gas 80, and the first manifold outlet port 44 is for connection to a lung-demand valve (LDV) 64 which is attached to a facemask 60. The second manifold outlet port 46 is for connection to an auxiliary device. In the embodiment shown in FIG. 2, the auxiliary device is a low-pressure warning device 70, such as an alarm or whistle, that sounds when the pressure of the breathable gas supplied to the manifold inlet port 42 falls below a minimum threshold, such as 2.5 bar.

Figure 3:
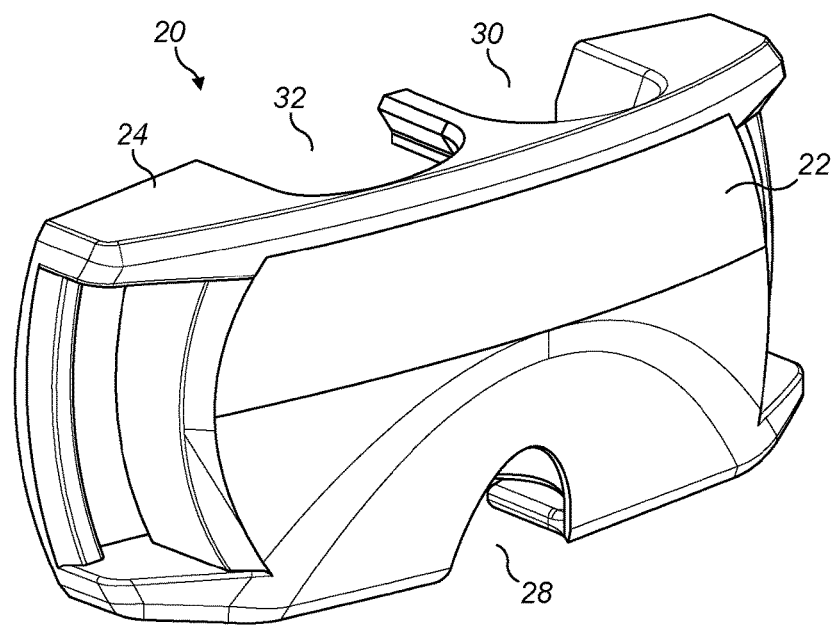
FIG. 3 schematically shows a perspective view of the holder of the waist mountable manifold of FIG. 1.
Figure 4:
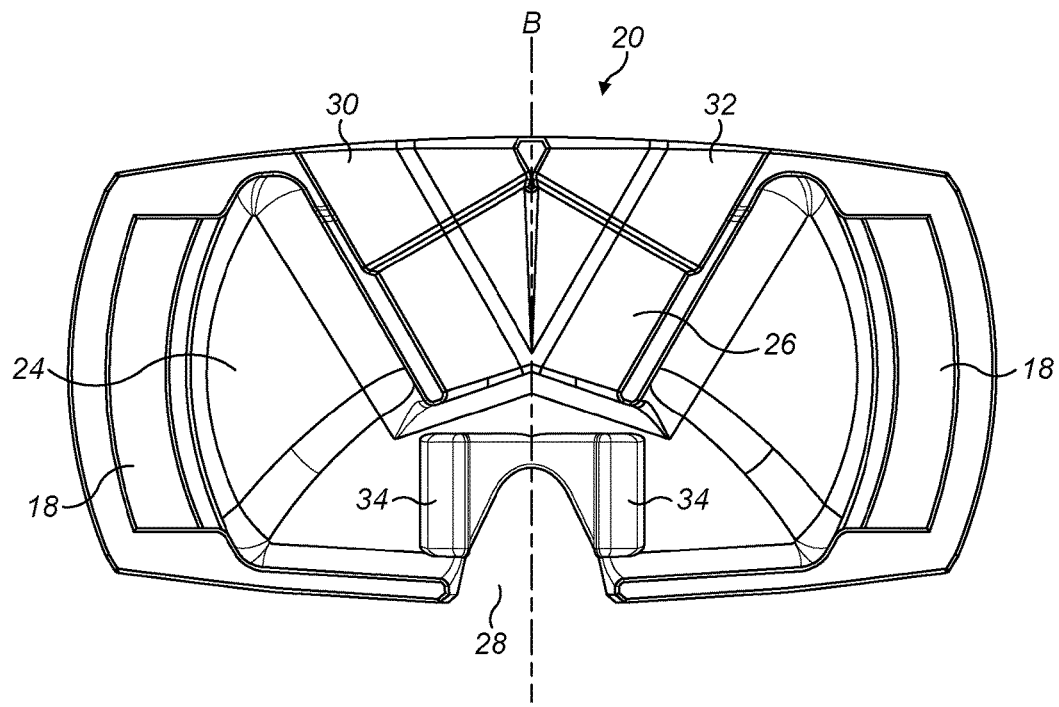
FIG. 4 schematically shows a rear view of the holder of the waist mountable manifold of FIG. 1.

With reference to FIG. 3 the holder 20 is an integrally formed component manufactured from a plastics material such as fibre reinforced Nylon®. The holder 20 has a front side 22 that in use faces away from the user and a rear side 24 that in use faces towards the user. The front side of the holder 20 is curved along its length and has a substantially smooth surface. As will be described below, this reduces the risk of snagging. As shown in FIG. 4, a socket 26 in the form of a cavity is provided on the rear side 24 of the holder 20 such that in use it faces and is open towards the user. The socket 26 is a substantially symmetrical Y-shape and comprises a lower channel 28 and first and second upper channels 30, 32. The socket 26 is substantially symmetrical shape about an axis B which extends through the centre of the lower channel 28. The shape of the socket 26 substantially corresponds to the external profile of the manifold 40. Specifically, the socket 26 is shaped such that the lower and upper branches 41, 43, 45 of the manifold 40 can be located within the lower and upper channels 28, 30, 32 of the socket 26. The lower channel 28 is provided with snap-fit retaining lugs 34 for retaining the manifold 40 within the socket 26. In particular, when the manifold 40 is located within the socket 26, the opposing retaining lugs 34 grip the lower branch 41 of the manifold 40 and retain it within the socket 26. The holder 20 is also provided with an elongate strap slot 18 at either side of the socket 26 through which a strap or belt 14 can be passed. This will be described in more detail below.

Figure 5:
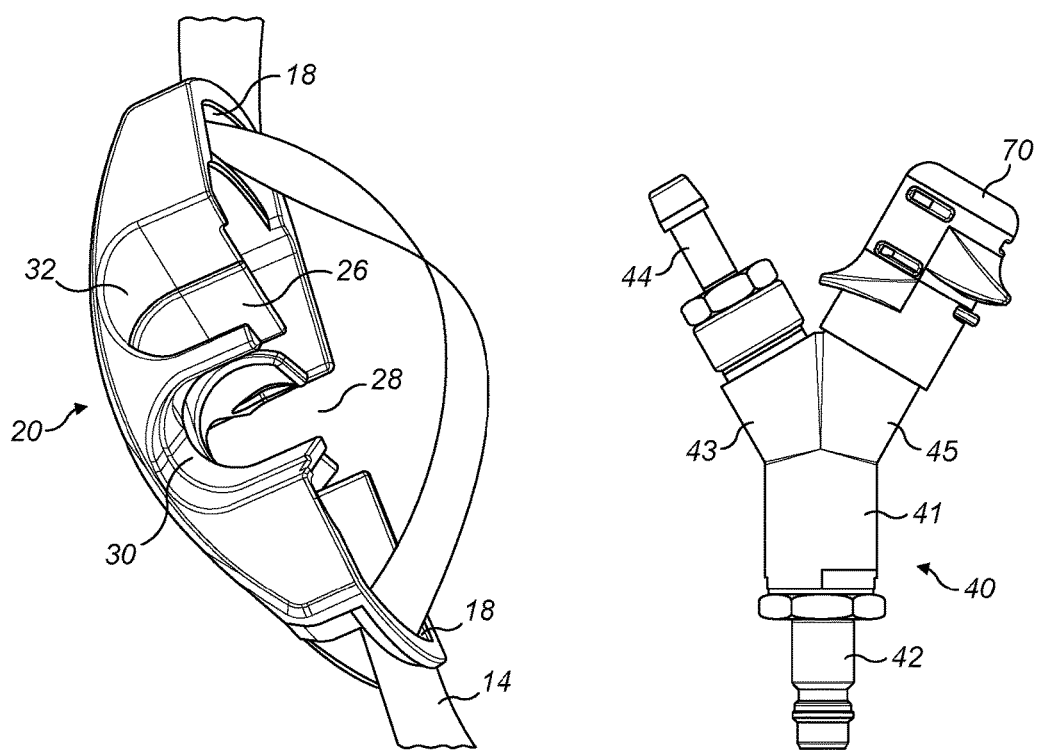
FIG. 5 schematically shows the breathing apparatus equipment with the manifold removed from the strap-mounted holder.

Referring back to FIG. 1, the waist belt 14 is an elongate strap that can be worn around a user's waist. The waist belt 14 comprises male and female connectors 16 that allows the waist belt 14 to be fastened around the user's waist, and is provided with an adjustment buckle (not shown) that allows the overall length of the waist belt 14 to be varied so as to provide a comfortable fit. As shown in FIG. 5, the waist belt 14 passes through the two strap slots 18 in the holder 20 such that the belt 14 extends across the rear side 24 of the holder 20 and across the socket 26. This configuration allows the holder 20 to be slid along the length of the belt 14.

Figure 6:
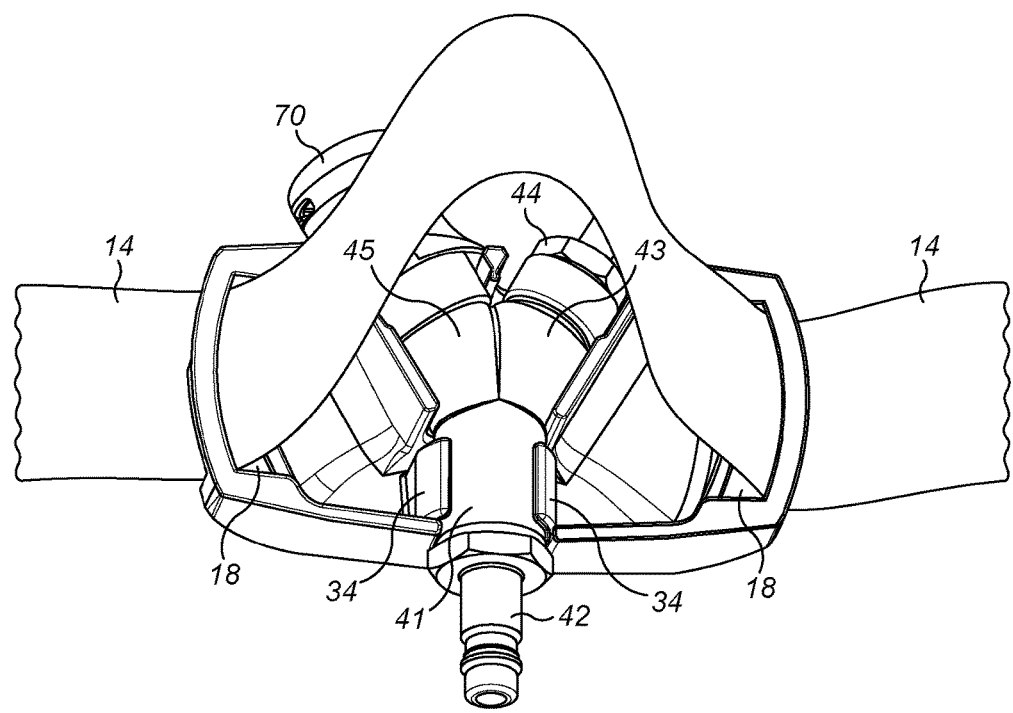
FIG. 6 schematically shows a rear view of the breathing apparatus equipment with the manifold located in the holder.

As shown in FIG. 6, the manifold 40 is removably located within the socket 26 of the holder 20. The lower branch 41 of the manifold 40 is located within the lower channel 28 of the socket 26, and the first and second upper branches 43, 45 of the manifold 40 are located in the first and second upper channels 30, 32 of the socket 26. With the manifold 40 located within the socket 26, the manifold inlet and manifold outlet ports 42, 44, 46 project from the holder 20. The manifold 40 snap-fits into the socket 26 and is retained within the socket by the retaining lugs 34 which grip the lower branch 41 of the manifold 40. The manifold 40 can be removed from the socket 26 with ease without any tools by simply pulling the manifold 40 away from the holder 20. This causes the retaining lugs 34 to be resiliently deformed to allow the manifold 40 to be removed from the socket 26.

Due to the shape of both the manifold 40 and the socket 26, the manifold 40 can be located within the socket 26 in two different orientations. In this particular embodiment this is because the shape of the socket 26 corresponds to a substantial part of the external profile of the manifold 40, and because the socket 26 and manifold 40 are substantially symmetrical. This means that the manifold 40 can be located in a first orientation (FIG. 7) in which the first manifold outlet port 44 located on the left side of the holder 20 as viewed from the front side, and in a second orientation (FIG. 8) in which the first manifold outlet port 44 is located on the right side of the holder 20 as viewed from the front side. The benefits of being able to locate the manifold 40 within the socket 26 in multiple orientations will be described in detail below. It should be appreciated that in other embodiments the socket and manifold may be configured differently in order to achieve the ability of being able to locate the manifold within the socket in multiple orientations.

Figure 7:
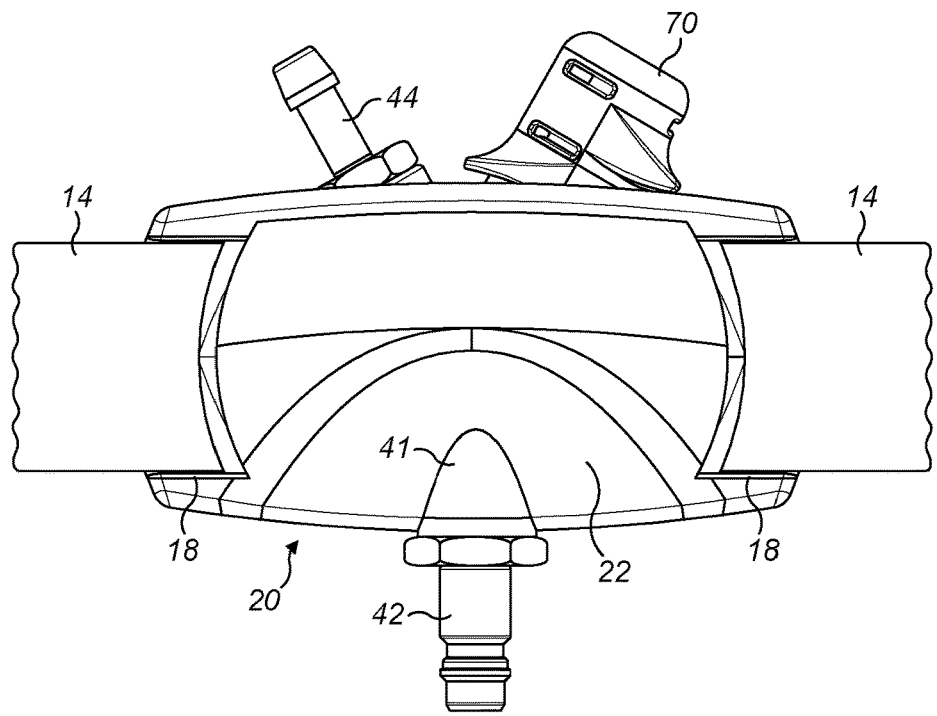
FIG. 7 schematically shows a front view of the manifold located in the holder in a first orientation.

In use, with the holder 20 slidably attached to the waist belt 14 and a manifold 40 in the socket 26, the user secures the belt 14 around his waist with the buckle 16. When worn, the front curved profile 22 of the holder 20 faces away from the user and the rear side 24 of the holder 20 provided with the socket 26 faces the user. Since the belt 14 extends across the rear side 24 of the holder 20, the manifold 40 is securely located between the holder 20 and the belt 14 (and the user's body). As the belt 14 is tightened, the portion of the belt 14 extending across the socket 26 ensures that the manifold 40 is fully pushed into the socket 26. If the manifold 40 is located within the socket 26 in the first orientation as shown in FIG. 7, the holder 40 is moved along the belt 14 so that it is located on the left side of the user's body. In this position the first manifold outlet port 44 of the manifold 40 is angled forwards and the second manifold outlet port 46 is angled rearwards.

The user then connects the first hose 82 between the LDV 64 attached to the facemask 62 and the first manifold outlet port 44 of the manifold 40, and connects the second hose 84 between the cylinder of breathable gas 80 and the manifold inlet port 42. This arrangement is shown in FIG. 1. The user then dons the facemask 62 and a valve (not shown) is opened so that breathable gas is supplied to the user. If desired, a hose clip (not shown) can be used to secure the first hose 82 to the user's garments. This may reduce the risk of snagging.

The breathing apparatus 1 including the waist mountable manifold 10 allows the user to work within an area of reduced or contaminated air. The breathing apparatus 1 allows the user to move around easily as the source of breathable gas is not worn by the user. Further, the waist mountable manifold 10 ensures that the hoses 82, 84 are kept close to the user's body which reduces any snagging hazard. In addition to this, since the manifold 40 is protectively housed in a holder 20 having a smooth front face 22 and is held against the user's body, any snagging risks are minimised. Due to its low profile, the breathing equipment 1 is particularly useful for work such as tank cleaning, painting, welding or inspection in confined spaces where the atmosphere is reduced and/or contaminated.

It has been described above that the manifold 40 is located within the socket 26 in the first orientation (FIG. 7) and the holder 20 is positioned on the left side of the user's body. In this configuration the first hose 82 attaches to the manifold 40 on the left side of the user's body, and the second hose 84 extends from the left hip region of the user's body up to the facemask 62. However, depending on the working conditions and equipment used, it may be desirable to have the manifold on the right side of the user's body so that the hoses 82, 84 are located on the right side.

Figure 8:
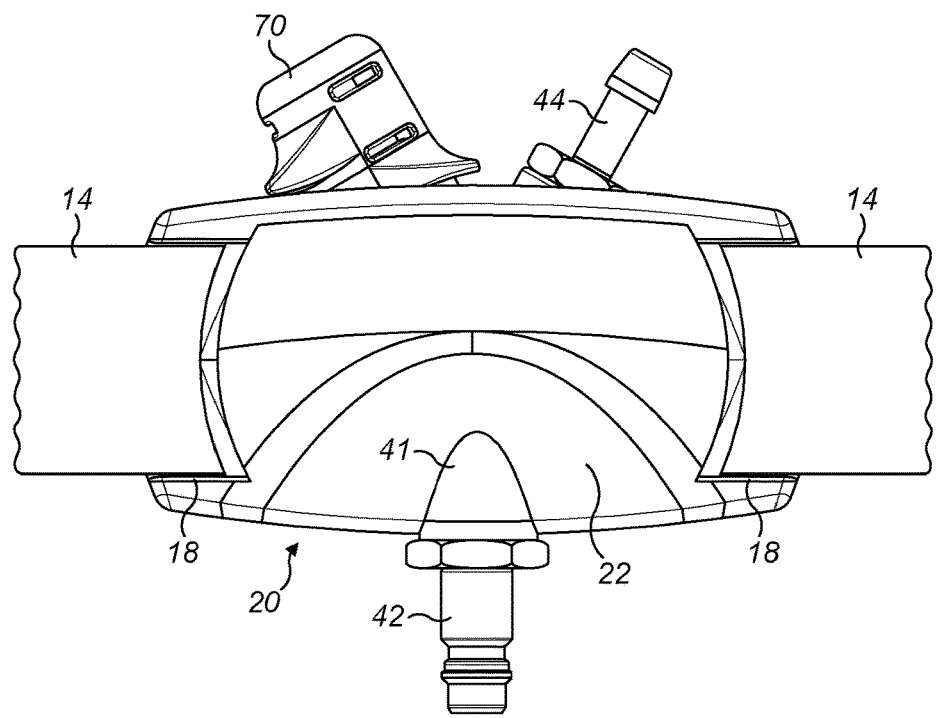
FIG. 8 schematically shows a front view of the manifold located in the holder in a second orientation.

In order to reposition the manifold 40 on the opposite side of the body, the belt 14 is loosened, and the manifold 40 is pulled out of the socket 26 by hand. The holder 20 is then slid along the length of the belt to the desired position, such as the right side of the body, and the manifold 40 is pushed into the socket 26 in the second orientation (FIG. 8). The belt 14 is then retightened which ensures that the manifold 40 is fully pushed into the socket 26. As described above, in the second orientation, the first manifold outlet port 44 to which the second hose 84 is attached is angled forwards.

With the embodiment described above, repositioning the manifold 40 can be achieved quickly and easily without any tools and without disconnecting or doffing the breathing apparatus 1. Thus, the manifold 40 and hoses 82, 84 can be repositioned during use without having to leave the working environment.

As opposed to fitting a low pressure warning device 70 to the second (or auxiliary) manifold outlet port 46, the manifold outlet port 46 may be configured so that it is suitable for other purposes. For example, it may be configured or suitable for use with a second breathable gas delivery device (such as an LDV or a constant flow device in which case it may be provided with a flow control device), a compressed gas driven tool, a paint spray gun, a ventilation vest, or a chemical protection suit.

Figure 9:
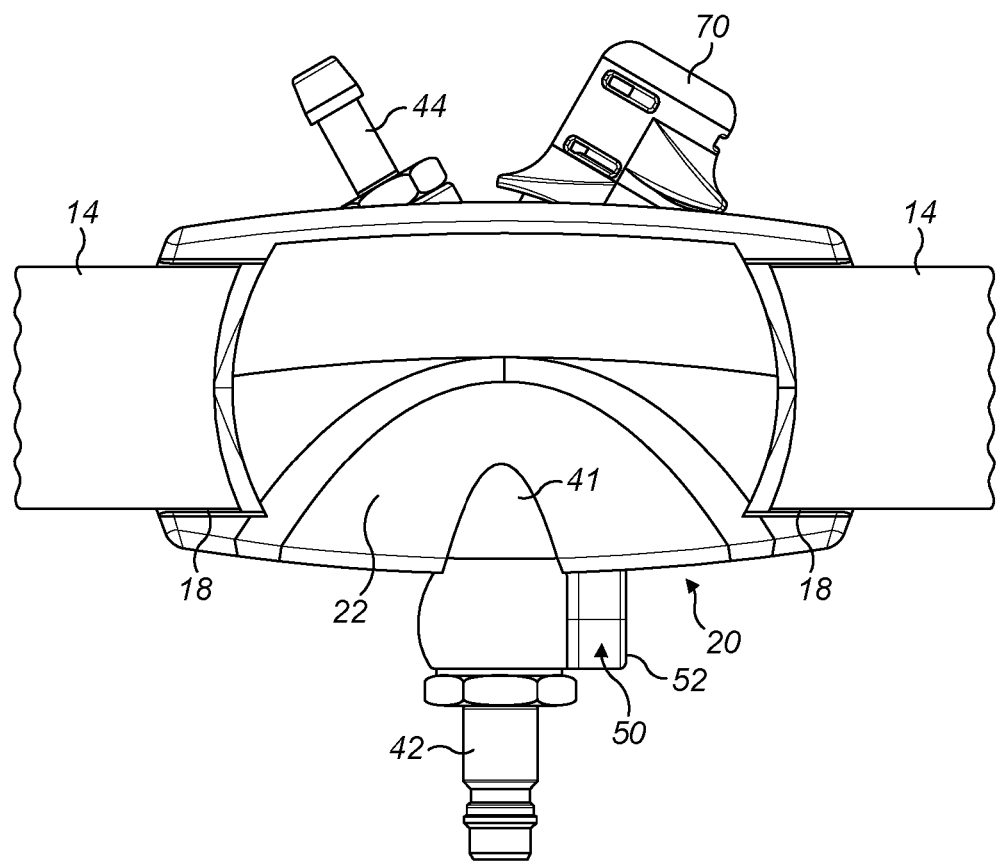
FIG. 9 schematically shows the arrangement of FIG. 7 with a banjo fitting attached to the manifold inlet port.

As shown in FIG. 9, a banjo fitting 50 may be attached to the inlet of the manifold 40 so as to provide a third manifold outlet port 52. In order to attach the banjo fitting 50 the manifold inlet port 42 is unscrewed from the lower branch 41 of the manifold 40 and a different manifold inlet port 42 around which the banjo fitting 50 is rotatably mounted is screwed into the lower branch 41. The third manifold outlet port 52 of the banjo fitting 50 is in fluid communication with the manifold inlet port 42. The third manifold outlet port 52 may be configured or suitable for use with a compressed gas driven tool, a paint spray gun, a ventilation vest, or a chemical protection suit, for example. The banjo fitting 50 may be rotated about an axis passing through the inlet port 42 so that the position of the third manifold outlet port 52 can be changed. For example, if the orientation of the manifold 40 within the socket 26 is changed so that the manifold 40 can be positioned differently with respect to the user, it may be desirable to rotate the banjo fitting 50 so that it is facing forwards.

It has been described that a substantial part of the external profile of the manifold 40 is a symmetrical Y-shape and that the socket 26 is a corresponding symmetrical Y shape. This allows the manifold 40 to be located within the socket 26 in first and second orientations that are mirror images of one another. However, the ability to locate a manifold in a socket in multiple orientations may be achieved with differently shaped manifolds and/or sockets. For example, the socket could be Y-shaped and the manifold could have a lower branch and a single upper branch extending obliquely with respect to the lower branch. This would allow the manifold to be located within the socket is first and second orientations that are mirror images of one another. In another example the socket could be a symmetrical X-shape and the manifold could be a non-symmetrical Y-shape. The skilled person should be able to appreciate other combinations of socket and manifold shape that allow the manifold to be located within the socket in multiple orientations.

Although it has been described above that the manifold has a single manifold inlet port and first and second manifold outlet ports, it should be appreciated that the manifold may have any suitable number of manifold inlet and manifold outlet ports. For example, the manifold could have a single manifold inlet port and three manifold outlet ports, a single manifold inlet port and a single manifold outlet port, or two manifold inlet ports and two manifold outlet ports.

In the embodiment described above the holder is mounted on a waist belt. However, it should be appreciated that in other embodiments, the holder may be mounted on any belt or strap which can be worn by the user. For example, the holder may be mounted or attached to a shoulder strap or a bandolier-style strap.

Figure 10:
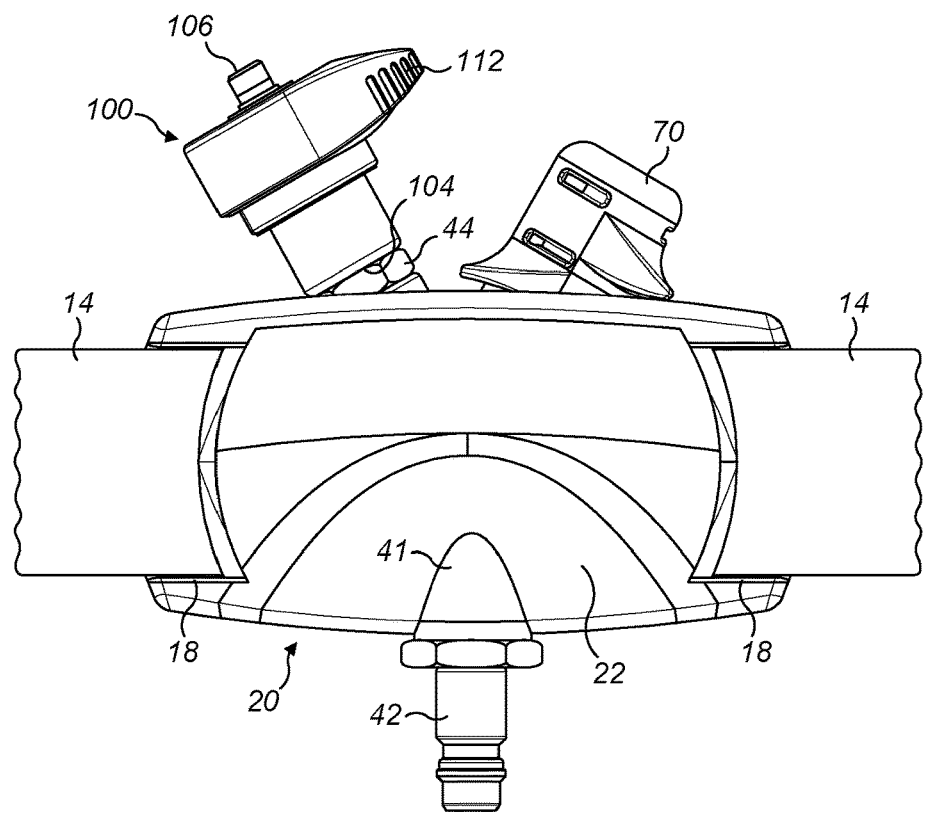
FIG. 10 schematically shows a manifold suitable for a constant flow delivery device having a control valve attached to a manifold outlet port.

In the foregoing embodiment it has been described that the delivery device 60 is a facemask 62 provided with a LDV 64. However, in other embodiments, the delivery device 60 may be a constant flow hood or mask or protection suit, for example. As shown in FIG. 10, in such an embodiment the manifold outlet port 44 to which the hood or mask is fluidically connected may be provided with a valve assembly in the form of a gas control valve 100 which both reduces the pressure of the breathable gas supplied at the manifold inlet port 42, and regulates the flow rate.

Figure 11:
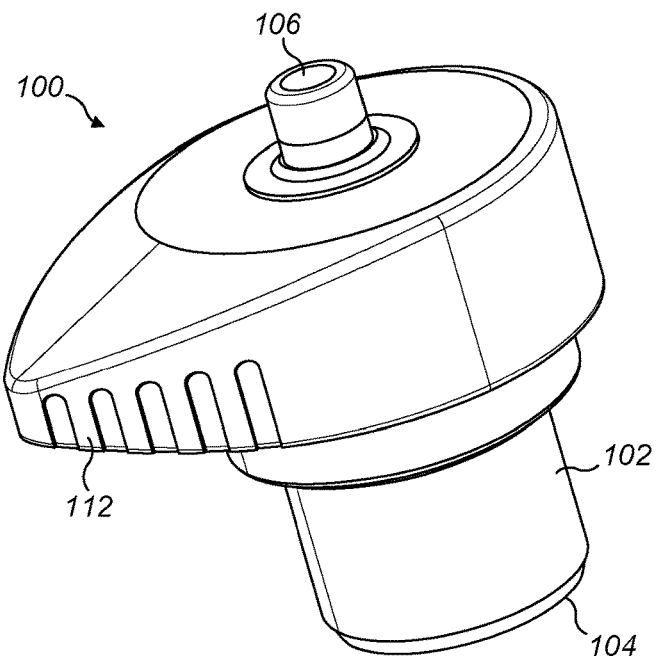
FIG. 11 schematically shows a perspective view of the control valve of FIG. 10.

As shown in FIG. 11, the gas control valve 100 comprises a valve assembly housing 102 provided with a valve assembly inlet port 104 at a lower end and a valve assembly outlet port 106 at an upper end. The inlet port 104 is for receiving a source of breathable gas and the outlet port 106 is for providing a constant regulated flow of breathable gas to a user. Referring back to FIG. 10, the inlet port 104 can be fluidically and physically connected to a manifold outlet port 44 such that the control valve 100 is mounted to the manifold 40 and receives breathable gas supplied at the manifold inlet port 42. A flexible conduit (not shown) can be used to fluidically connect the outlet port 106 to a breathable gas delivery device such as a hood (not shown) for supplying breathable gas to a user.

The control valve 100 comprises a pressure reduction valve 108 (FIG. 12) which receives breathable gas from the inlet port 104 and reduces the pressure of it, and a separate flow control valve 110 (FIG. 12) downstream of the pressure reduction valve 108 which receives reduced pressure breathable gas from the pressure reduction valve 108 and delivers it from the outlet port 106 at a controlled flow rate. The pressure reduction valve 108 and the flow control valve 110 are both at least partly disposed within the same housing 102. The flow control valve 110 comprises a flow adjuster 112 in the form of a rotatable knob disposed outside of the housing 102 which can be rotated to adjust the flow rate of the breathable gas without altering the pressure at which it is supplied.

Figure 12:
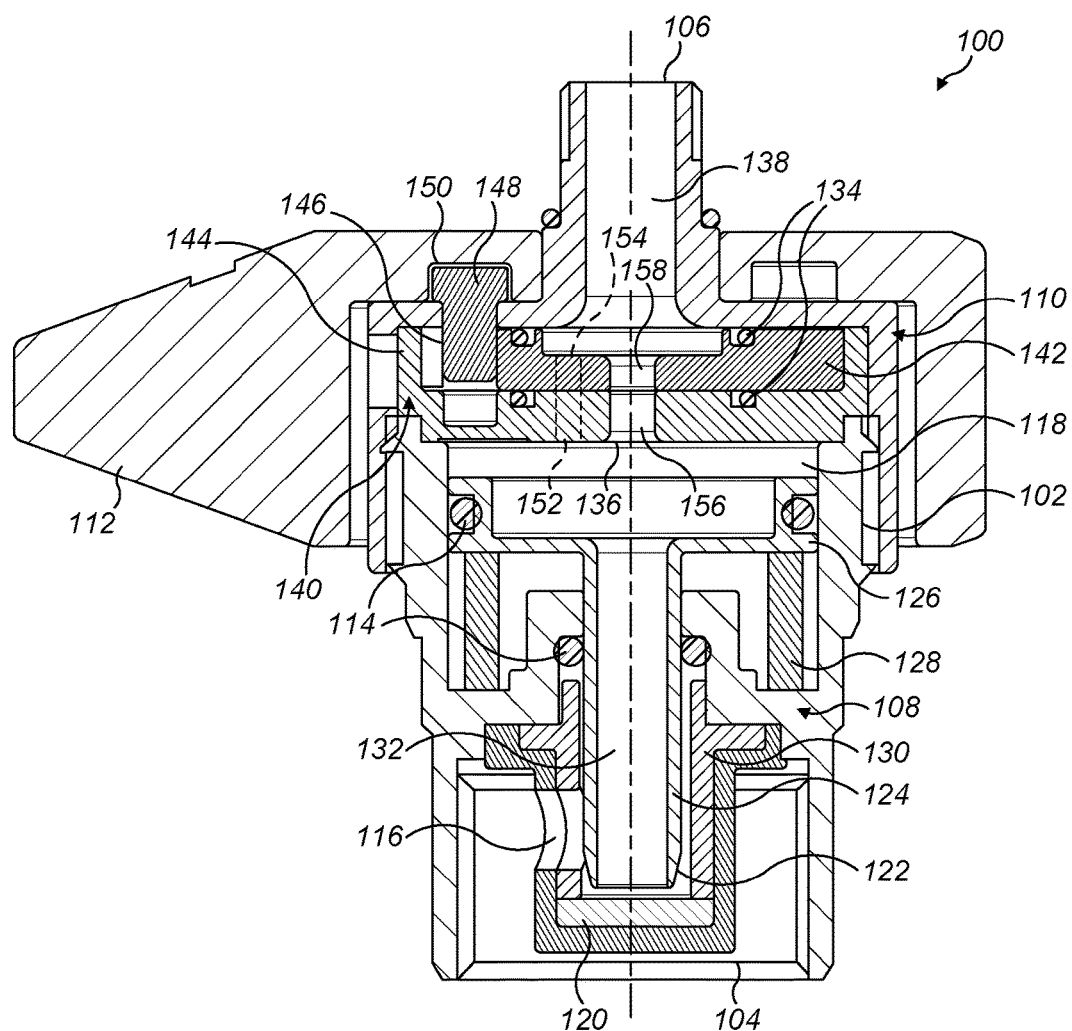
FIG. 12 schematically shows a cross-sectional view through the control valve with the pressure reduction valve in an open position.

Referring now to FIG. 12, the pressure reduction valve 108 is sealed within the housing 102 by O-rings 114 and is disposed towards the lower, upstream end of the housing 102. The pressure reduction valve 108 comprises a pressure reduction valve inlet 114 at the upstream end of the pressure reduction valve 108 which is arranged to receive breathable gas from the inlet port 104, and a pressure chamber 118 at the downstream end of the pressure reduction valve 108 which is arranged to supply reduced pressure breathable gas to the flow control valve 110. Disposed between the inlet 114 and the chamber (or outlet) 118 is a valve arrangement comprising a valve seat 120, a valve member 122, a piston shaft 124, a piston 126 and a resilient biasing means 128 which are all coaxial with one another and the general axial direction of the control valve 100.

Figure 13:
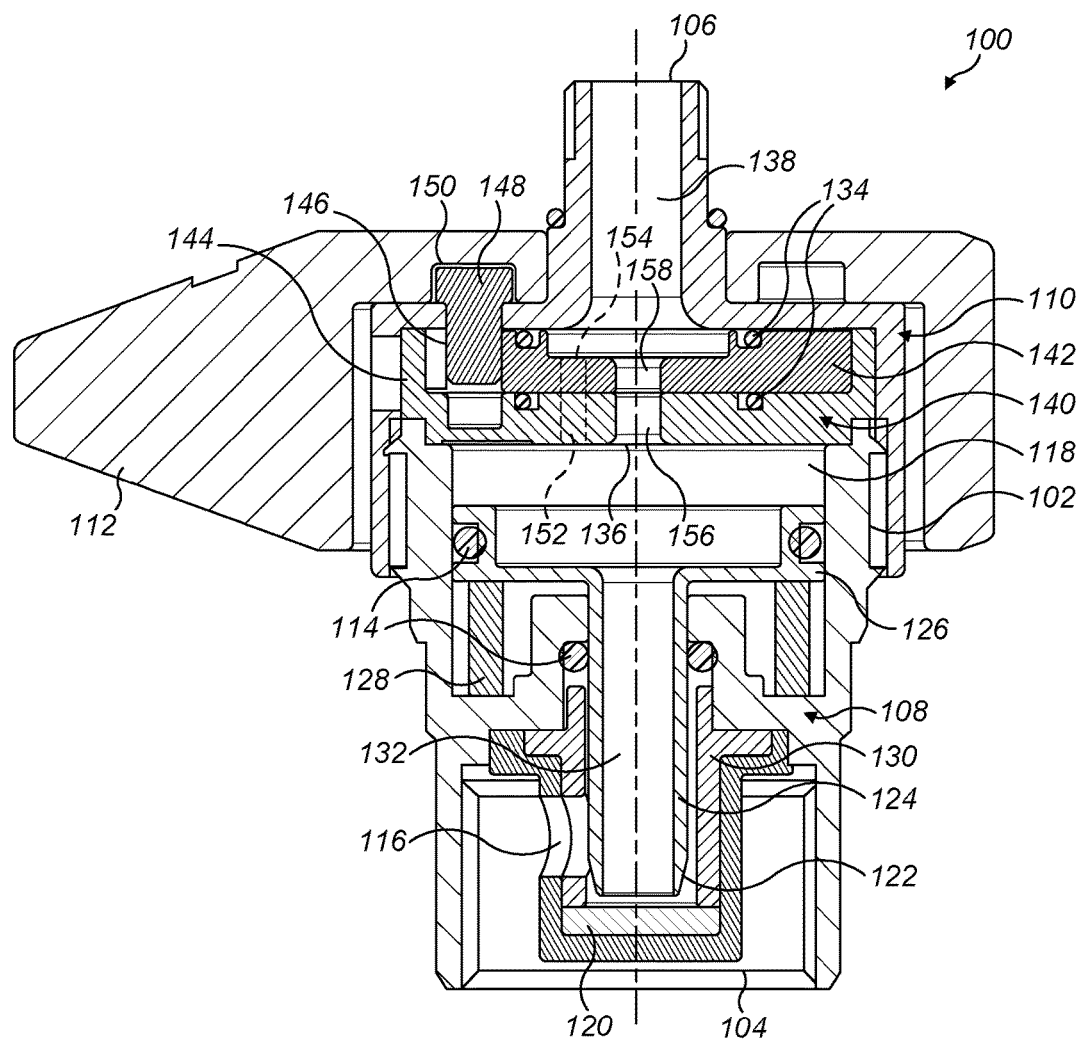
FIG. 13 schematically shows a cross-sectional view through the control valve with the pressure reduction valve in a closed position.

The valve inlet 114 is in the form of a bore formed in a cylindrical wall 130 and the valve seat 120 is disposed within the cylindrical wall 130 and is axially located below the valve inlet 114. The valve seat 120 is in the form of an elastomeric disc. Slidably disposed within the cylindrical wall is the piston shaft 124, the lower tip of which forms the valve member 122 and the upper end of which is attached to the piston 126 which is located within the pressure chamber 118. The piston shaft 124 is hollow along its entire length forming a fluid passageway 132 which passes through the piston 126 and opens into the pressure chamber 118. The resilient biasing means 128 acts between the housing 102 and the piston 126 and biases the piston, piston shaft and valve member upwards to an open position (FIG. 12) in which the valve member 122 is axially spaced away from the valve seat 120. In the open position there is an open fluid passageway between the valve inlet 116 and the pressure chamber 118 as gas can flow between the valve member 122 and the valve seat 120 and through the fluid passageway 132. As will be described in detail below, gas within the pressure chamber 118 acts on the piston 126 to move it towards a closed position (FIG. 13) in which the valve member 122 is seated on the valve seat 120 thereby preventing flow through the pressure reduction valve 108. The spring force of the resilient biasing means 128 determines the pressure at which the pressure reduction valve 108 closes (i.e. at what pressure the valve member 122 contacts the valve seat 120 thereby closing the fluid passageway). The resilient biasing means 128 may be a spring, such as a coil spring, or a mass of resiliently deformable material, for example.

The flow control valve 110 is sealed within the housing 102 by O-rings 134 and is disposed towards the upper, downstream end of the housing 102. The flow control valve 110 comprises a flow control valve inlet 136 at the upstream end of the flow control valve 110 which is in direct fluid communication with the pressure chamber 118 and is arranged to receive reduced pressure breathable gas therefrom, and a flow control valve outlet 138 which is arranged to deliver reduced pressure breathable gas at a controlled flow rate to the outlet port 106. Disposed within the housing 102 between the inlet and outlet 136, 138 is a lower plate member 140 and an upper plate member 142. The lower and upper plates 140, 142 are generally disc-like and are coaxially aligned with one another and the general axial direction of the control valve. The lower and upper plates 140, 142 lie on top of one another such that they abut.

The lower plate 140 is rotatably and axially fixed within the housing 102 and comprises an annular wall portion 144 that extends upwardly. The upper plate 142 has a diameter substantially the same as the inner diameter of the annular wall portion 144 and is located within the annular wall 144 such that it is sealed against the lower plate 140. The upper plate 142 is rotatable with respect to the lower plate 140 about the axis of the control valve 100. The upper plate 142 is provided with a hole 146 within which a first end of a pin 148 is located. The other end of the pin 148 is located within a hole 150 provided in the flow adjuster knob 112 which is itself rotatably mounted to the housing 102 about the axis of the control valve 100. Therefore, rotation of the flow adjuster knob 112 causes the upper plate 142 to be rotated with respect to the lower plate 140 within the housing 102. Stops (not shown) are provided to limit the rotation of the flow adjuster knob 112 between maximum and minimum angular limits.

Figure 14:
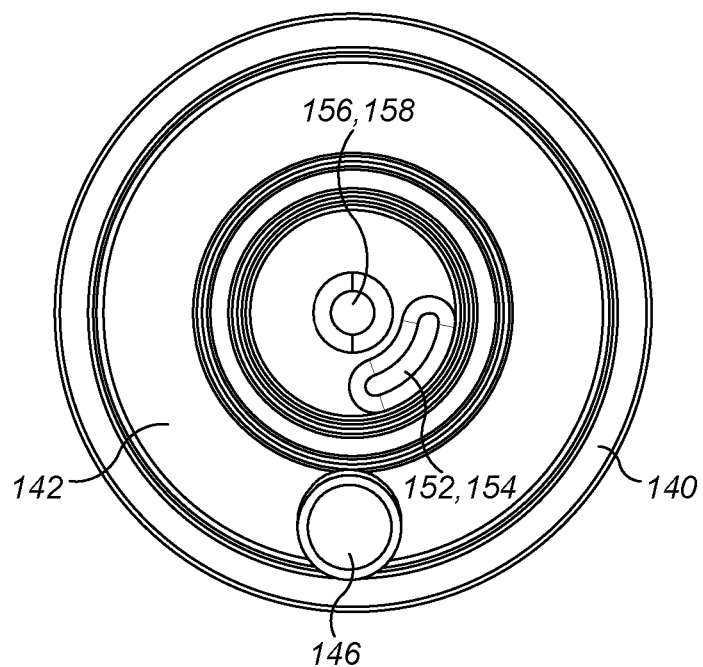
FIG. 14 schematically shows a plan view of the first and second plates of the flow control valve in a maximum flow state.
Figure 15:
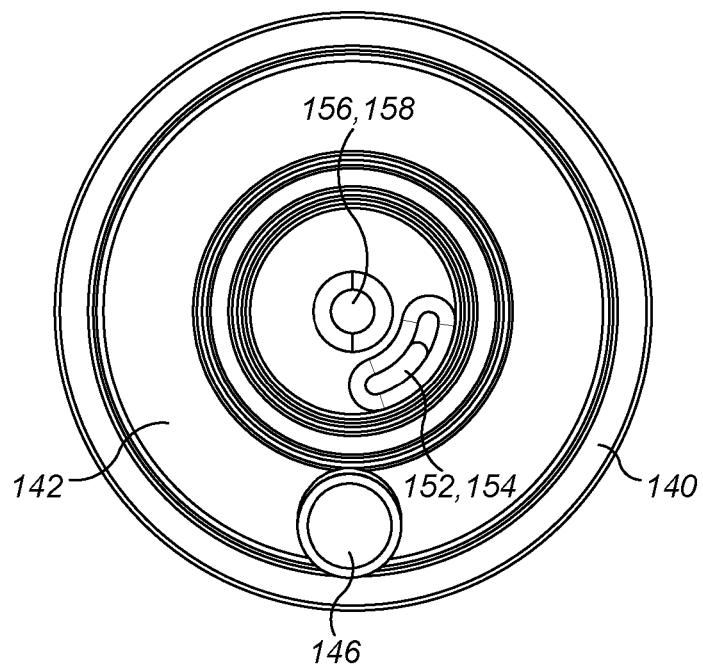
FIG. 15 schematically shows a plan view of the first and second plates of the flow control valve in a reduced flow state.

With additional reference to FIGS. 14 and 15, the lower and upper plates 140, 142 are each provided with an orifice opening 152, 154 and a bypass opening 156, 158. The orifice openings 152, 154 are in the form of arcuate slots that are at the same radial position and the bypass openings 156, 158 are in the form of central openings that are coaxially aligned. As can be seen from the Figures, since the bypass openings 156, 158 are coaxial with one another, they are always aligned to the same extent regardless of the relative rotational position of the lower and upper plates 140, 142. The bypass openings 156, 158 therefore form a bypass passageway through the upper and lower plates 140, 142 of a fixed size. However, since the orifice openings 152, 154 are arcuate, the alignment between the slots can be adjusted between complete alignment (FIG. 13), partial alignment (FIG. 14), and no alignment. This variation can be achieved by rotating the upper plate 142 relative to the lower plate 140 using the flow adjuster knob 112. Therefore, the orifice openings 152, 154 form a orifice passageway through the lower and upper plates 140, 142 of a variable size. Together, the orifice openings 152, 154 and the bypass openings 156, 158 provide a flow passageway through the lower and upper plates 140, 142, the size of which can be varied between a fixed minimum size (the size of the fixed bypass passageway) and a maximum size (the size of the orifice passageway when the orifice openings 152, 154 are in complete alignment and the fixed bypass passageway). As will be described in detail below, the flow adjuster know 112 can be rotated (thereby rotating the upper plate 142) to vary the size of the flow passageway so as to control the flow rate of breathable gas delivered from the control device 100 without changing the pressure.

In use, the inlet port 104 of the control valve 100 is attached to the manifold outlet port 44 and the outlet port 106 of the control valve 100 is attached to a constant flow delivery device, such as a hood, using a flexible conduit (not shown). The manifold inlet port 42 is connected to a source of breathable gas, such as a compressed air network (or ring main) installed within a building, using another flexible conduit (not shown). The manifold 40 may be worn around a user's waist using the waist belt 14.

In this embodiment the supply pressure of the source of breathable gas may be between 2.8 bar and 10 bar. This pressure is received at the inlet port 104 and flows through the pressure reduction valve inlet 116. The pressurised gas then flows under the valve member 122 and through the flow passageway 132 into the pressure chamber 118. The pressurised gas acts on the piston 126 and acts against the resilient biasing means 128 to move the piston, piston shaft and valve member towards the closed position (FIG. 13) in which the valve member 122 is engaged with the valve seat 120. The spring force of the resilient biasing means 128 is chosen to set the pressure delivered from the pressure reduction valve 108 at a desired value P. Specifically, the spring force is set so that when the pressure within the pressure chamber 118 is P, the valve member 122 is seated on and engages the valve seat 120 preventing any gas flow through the pressure reduction valve 108. In this embodiment the pressure value P is set at 2.5 bar. This ensures that the pressure delivered from the pressure reduction valve 108 is 2.5 bar. The breathable gas within the pressure chamber 118 then flows through the flow control valve 110 to the outlet port 106 and ultimately the hood. As the pressure within the pressure chamber 118 reduces and falls below P, the spring force of the resilient biasing means 128 moves the piston, piston shaft and valve member to an open position (FIG. 12) in which the valve member 122 is spaced away from the valve seat 120. This opens the flow path and allows breathable gas to flow from the inlet 116 to the pressure chamber 118. This causes the pressure to rise within the pressure chamber 118 which closes the valve. This cycle repeats continuously ensuring that the pressure of the breathable gas within the pressure chamber 118 is at or about P. In reality, this may mean that the piston, piston shaft and valve member "hover" with the valve member 122 just above the valve seat 120.

The breathable gas within the pressure chamber 118 flows through the flow control valve 110 to the outlet port 106 at a controlled flow rate. The gas is allowed to flow through both the orifice passageway defined by the orifice openings 152, 154 and the bypass passageway defined by the bypass openings 156, 158. Since in this embodiment the size of the bypass opening is fixed at a minimum, it is not possible to completely shut-off the flow control valve 110 and therefore the breathable gas is always supplied at a minimum flow rate. The minimum flow rate is defined by the size of the bypass opening and in this embodiment the minimum flow rate is 170 liters/minute. This may be the minimum safe flow rate of breathable gas and therefore the bypass passageway may provide an important safety feature. In order to increase or decrease (but only to a minimum) the flow rate of the breathable gas supplied to the hood, the flow adjuster knob 112 can be rotated causing the degree of alignment of the orifice openings 152, 154 to change, thereby altering the size of the orifice passageway. The degree of alignment of the orifice openings 152, 154 can be altered between complete alignment and no alignment. At complete (or maximum) alignment the flow rate of the breathable gas is at a maximum which in this embodiment is 350 liters/minute. At no alignment the breathable gas only flows through the bypass passageway and the flow rate is therefore 170 liters/minute.

An important feature of the control device 100 is that the flow rate of the breathable gas delivered from the outlet port 106 is independent of the pressure supplied at the inlet port 104 within a specified range. The specified range of input pressure may be between 2.8 bar and 10 bar, for example. This means that if the supply pressure of the source of breathable gas changes, for example if a number of additional users connect to the same ring main, the flow rate of breathable gas delivered from the outlet port 106 does not change. This may be important to ensure the safety of the users. Further, altering the flow rate of the breathable gas delivered from the outlet port 106 does not change the pressure of the breathable gas delivered from the outlet port 106. These benefits result from the pressure reduction valve 108 and the flow control valve 110 being separate and independent from one another, albeit housed in a common housing. In some known prior art arrangements if the supply pressure drops, the flow rate delivered drops automatically which may be undesirable or hazardous. This significant disadvantage is overcome with the above described arrangement.

Although it has been described that the control valve 100 can be attached to a manifold inlet port 44 of a manifold 40, it should be appreciated that it could be used with other types of breathing equipment and could be mounted on or to other components.

If a constant flow breathable gas delivery device, such as a mask or hood, is used it may be desirable for the user to be able to inhale ambient air without removing the mask or hood. For example, it may be desirable for the user to don the mask or hood before commencing work and breathe ambient air, and then only breathe pressurised breathable gas from a source of breathable gas, such as a compressed air network (or ring main) installed within a building, when they start work. This may preserve the source of breathable gas; only using it when necessary.

Figure 16:
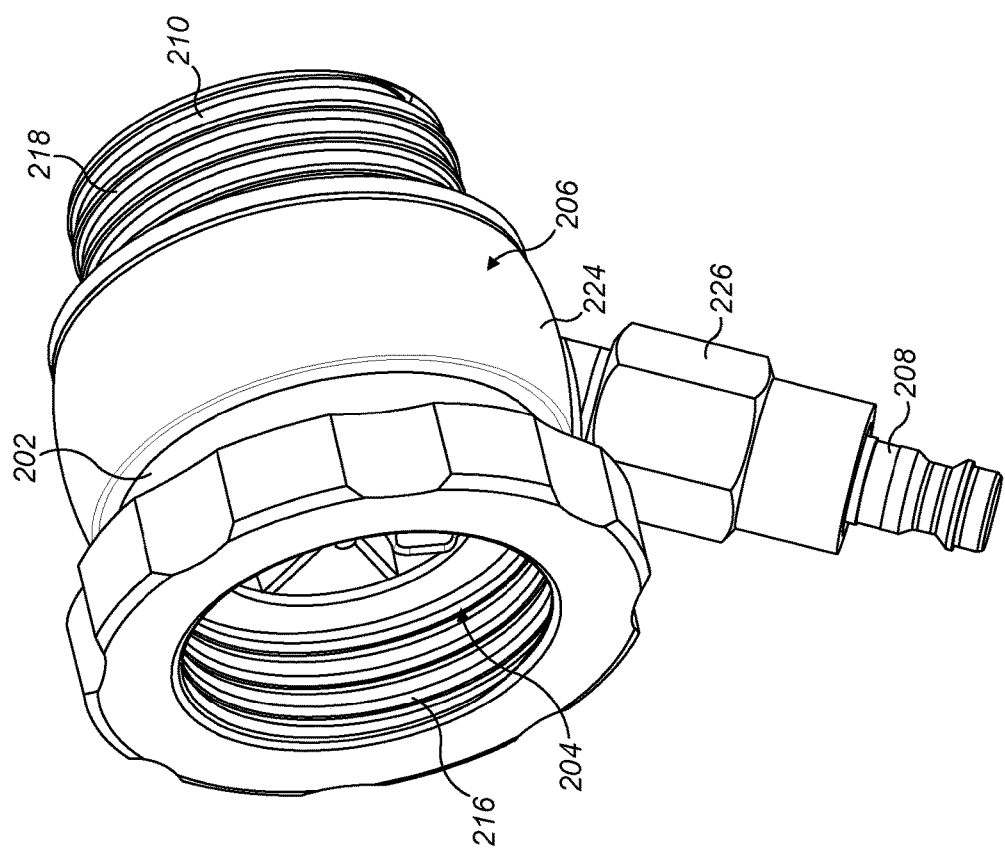
FIG. 16 schematically shows a perspective view of an adapter suitable for use with a constant flow delivery device.
Figure 16:
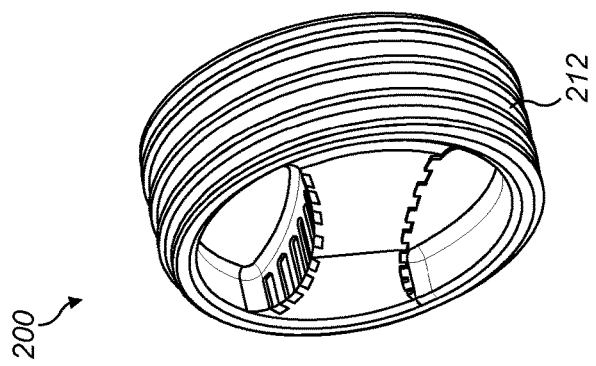

FIG. 16 schematically shows an adapter 200 which may help achieve the above objective. The adapter 200 comprises an adapter body 202, an ambient air inlet port 204, a rotatable part 206 having a pressurised gas inlet port 208, a threaded adapter outlet port 210 and a blanking plug 212. In use, the threaded adapter outlet port 210 can be threadedly attached to the threaded gas inlet port of a breathable gas delivery device, such as a hood or mask, such that it is fluidically and physically coupled to the delivery device. A pressurised source of breathable gas, such as breathable gas from a compressed air network (or ring main) can be fluidically connected to the pressurised gas inlet port 208 using a flexible conduit (not shown). When the source of breathable gas is turned on the user can inhale this through the adapter outlet port 210, but if the source of breathable gas is turned off, the user can inhale ambient air through the ambient air inlet port 204 and the adapter outlet port 210. If it is required to close off the ambient air inlet port 204 completely, the blanking plug 212 can be located within it.

Figure 17:
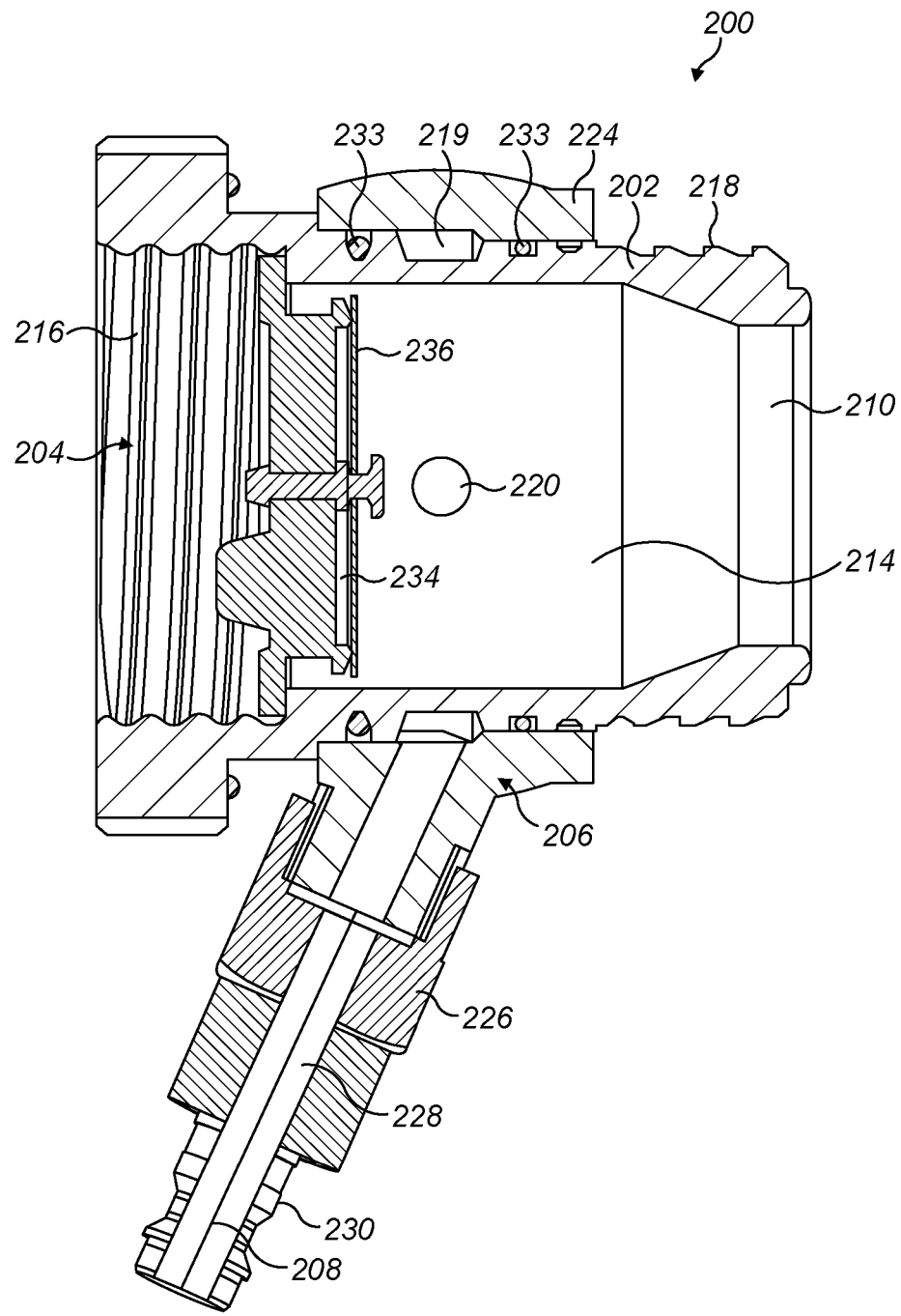
FIG. 17 schematically shows a cross-sectional view through the adapter of FIG. 16.
Figure 18:
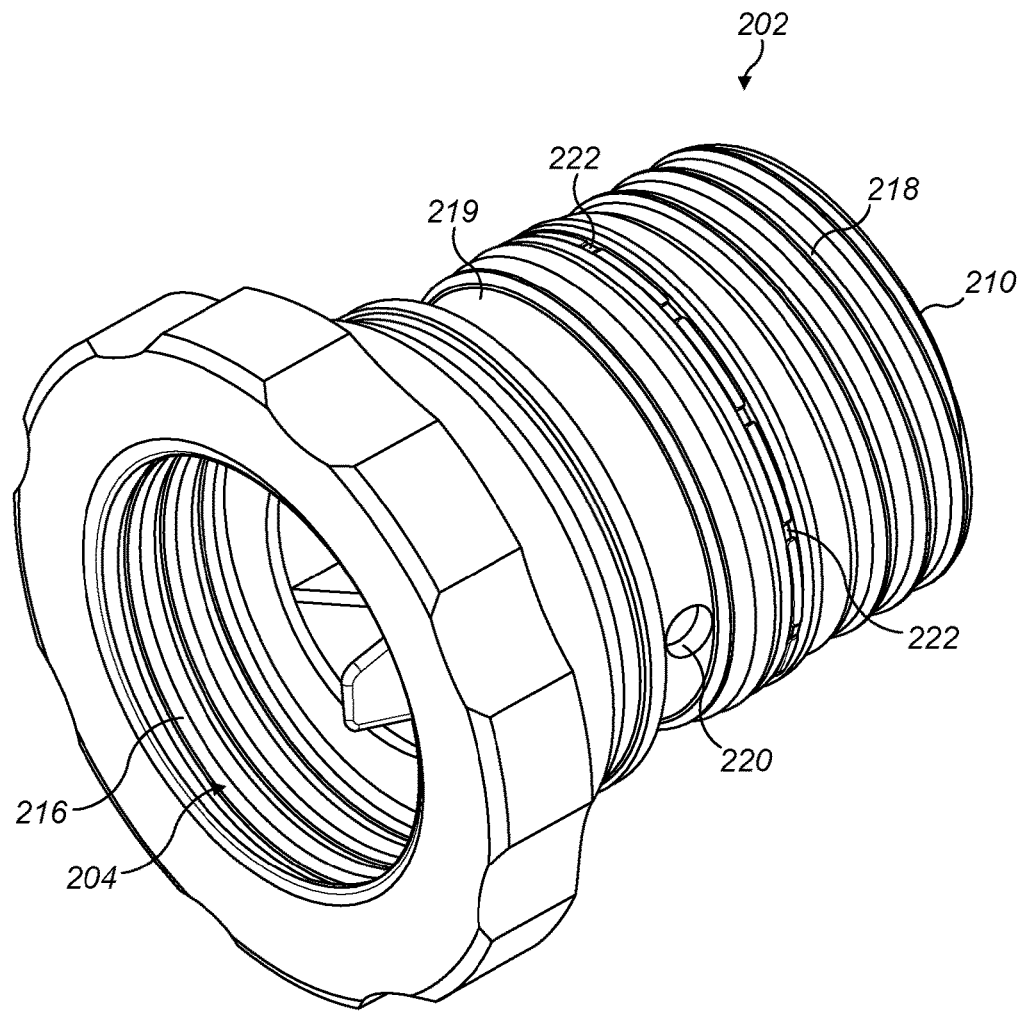
FIG. 18 schematically shows a perspective view of the adapter body of the adapter of FIG. 16.

Referring now to FIGS. 17 and 18, the adapter body 202 is generally cylindrical and defines an adapter chamber 214. The first end of the adapter body 202 is open and forms the ambient air inlet 204 which opens into the adapter chamber 214. The second opposing end of the adapter body 202 is also open and opens into the adapter chamber 214 and forms the adapter outlet port 210. The inner surface of the adapter body 202 at the first end is threaded 216 and the blanking plug (FIG. 16) is threaded on an outer surface such that it can be threaded into the ambient air inlet port 204 to seal it. The outer surface of the second end of the adapter body 202 is also threaded and forms an adapter connector 218 which allows the adapter 200 to be threadedly attached to a breathable gas delivery device. Although generally cylindrical, the outer surface of the adapter body 202 is provided with a number of annular channels. One of the annular channels provides an annular fluid channel 219 within which two fluid passageways 220 are provided which are diametrically opposite and which extend through the wall of the adapter body 202 into the adapter chamber 214. As will be described in detail below, the pressurised gas inlet port 208 is in fluid communication with the adapter chamber 214 through these passageways 220. In another of the annular channels a plurality of, in this case 12, small recesses 222 are formed which are circumferentially equally spaced around the adapter body 202. As will be described in detail below, these small recesses 222 form part of an indexing feature.

Disposed within the adapter chamber 214 is a filter 234 and a one-way diaphragm valve 232. Both are disposed between the ambient air inlet port 204 and the adapter chamber 214 and therefore separate the ambient air inlet port 204 from both the pressurised gas inlet port 208 and the adapter outlet port 210. The filter 234 prevents any particulate from being inhaled into the adapter chamber 214 and then out through the adapter outlet port 210. The one-way valve 236 permits the flow of air into the adapter chamber 214 through the ambient air inlet port 204, but prevents the flow of gas, such as pressurised gas supplied through the pressurised gas inlet port 208, from exiting to the atmosphere through the ambient air inlet port 204.

Figure 19:
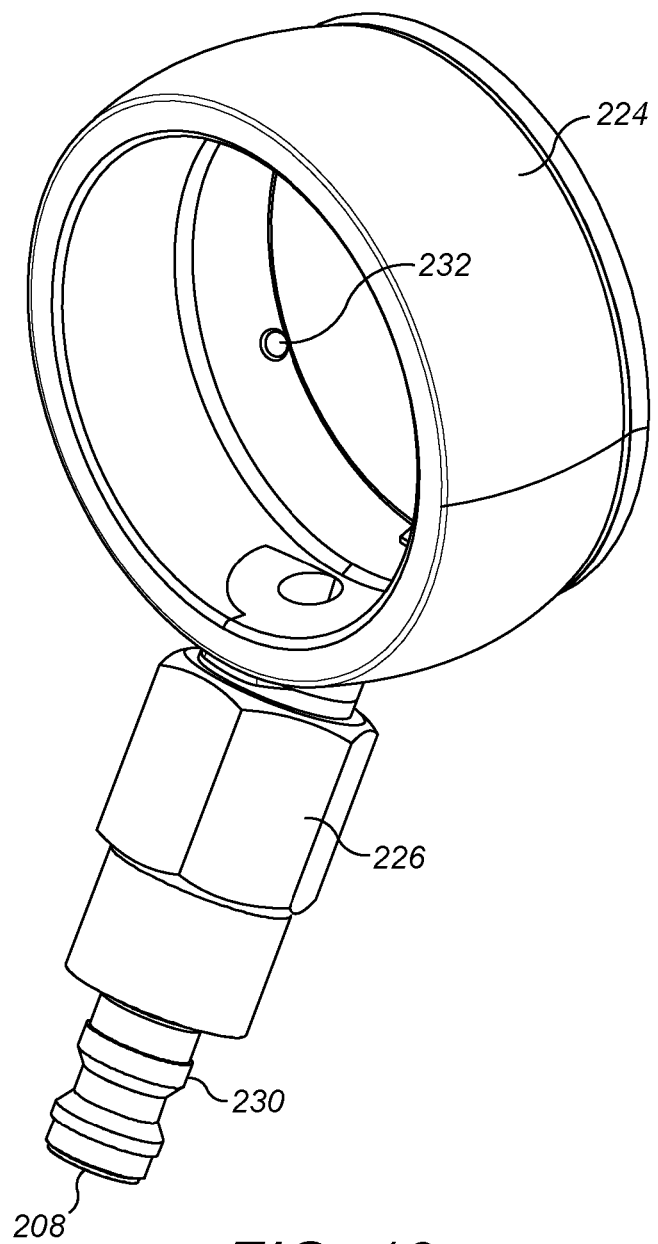
FIG. 19 schematically shows a perspective view of the rotatable part of the adapter of FIG. 16.

Referring now also to FIG. 19, the rotatable part 206 comprises an annular member 224 having an inner diameter comparable to the outer diameter of the adapter body 202 and a stem 226 which extends radially and slightly forward from the annular member 224. The stem 226 is hollow along its entire length and forms a fluid passageway 228 which is open at the inner surface on the annular member 224. The end of the stem 226 is open and provides the pressurised gas inlet port 208. The end of the stem 226 is also provided with a connector 230 which allows a flexible conduit carrying pressurised breathable gas to be connected to the pressurised gas inlet port 208. On the inner surface of the annular member 224 a plurality of, in this case six, small projections 232 are formed which are circumferentially and equally spaced around the inner circumference. As will be described in detail below, these cooperate with the small recesses 222 formed on the adapter body 202 to provide an indexing feature.

Referring back to FIG. 17, the rotatable part 206 is rotatably mounted to the adapter body 202 with the annular member 224 surrounding the generally cylindrical adapter body 202. Two O-rings 233 are provided in annular channels to seal the annular member 224 to the adapter body 202. The rotatable part 206 is located such that the passageway 228 of the stem 226 is axially aligned with the annular fluid channel 219 which ensures that the pressurised gas inlet port 208 is in fluid communication with the adapter chamber 214 through the fluid passageways 220 regardless of the angular position of the rotatable part. Also, the rotatable part 206 is located such that the recesses 222 formed in the outer surface of the adapter body 202 are axially aligned with the projections 232 formed on the inner surface of the annular member 224. The rotatable part 206 can be rotated to a plurality of, in this case 12, discrete angular positions so as to change the position of the stem 226 and pressurised gas inlet port 208 whilst ensuring fluid communication between the pressurised gas inlet port 208 and the adapter chamber 214. The plurality of discrete angular positions are defined by the angular spacing of the recesses 222 and at each position the six projections 232 engage with six of the 12 recesses 222. The engagement of the recesses 222 and projections 232 inhibit the rotational movement of the rotatable part 206 away from that angular position. However, by applying a sufficiently large rotational force one or both of the parts resiliently deform, causing the projections 232 and recesses 222 to disengage allowing the rotatable part 206 to be rotated to a different angular position. This indexing feature allows the rotatable part 206 to be temporarily locked in one of a number of angular positions whilst allowing the angular position of the rotatable part to be easily adjusted.

Figure 20:
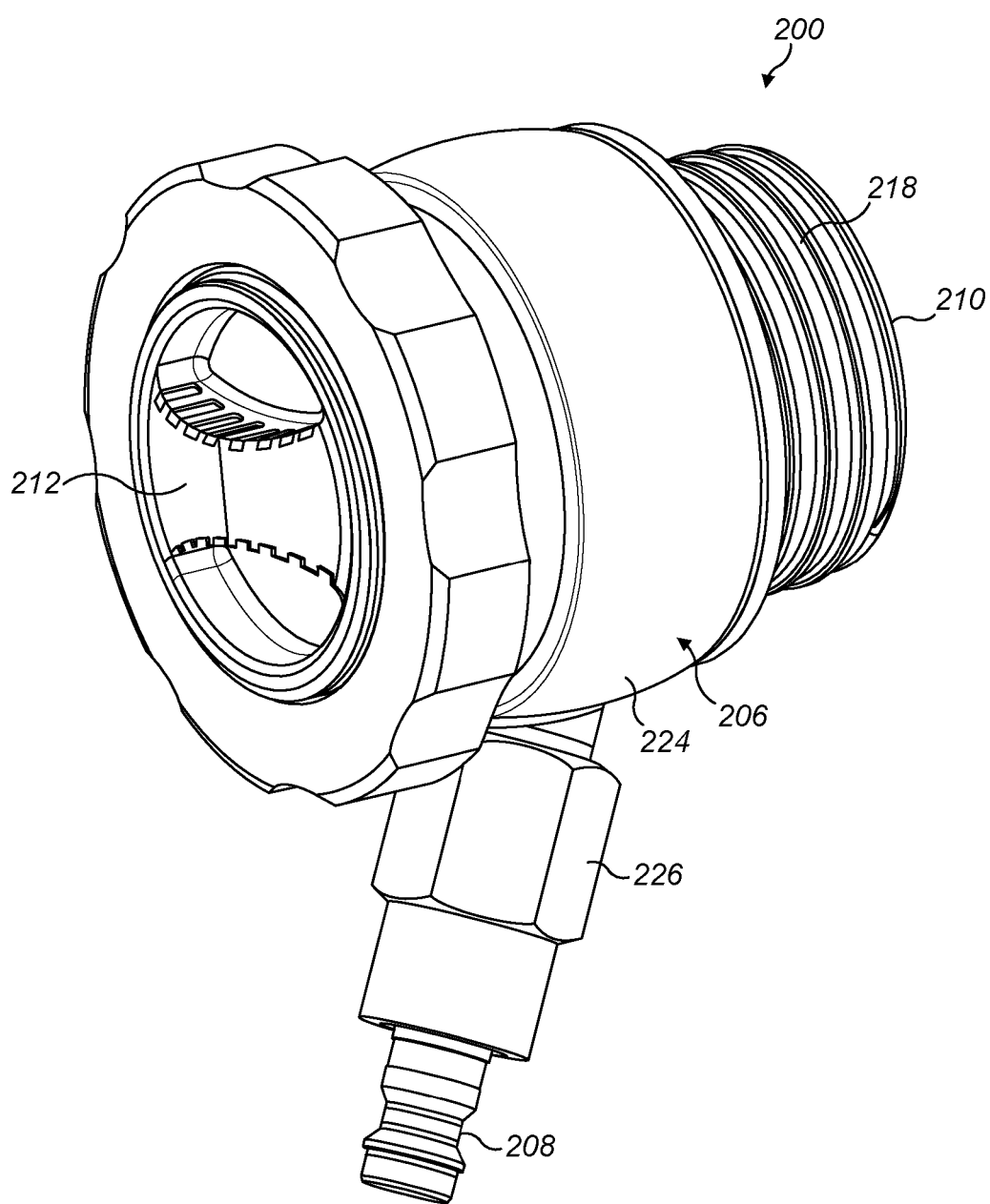
FIG. 20 schematically shows a perspective view of the adapter of FIG. 16 with the blanking plug located within the ambient air inlet port.

In use, the adapter 200 is connected to a breathable gas delivery device, such as a mask, with the adapter connector 230 threaded into the gas inlet port of the mask. This ensures fluid communication between the adapter outlet port 210 and the gas inlet port of the mask. A pressurised source of breathable gas, such as a compressed air network (or ring main), is connected to the pressurised gas inlet port 208 of the adapter 200 using a flexible conduit. The flexible conduit may be fluidically connected to a manifold outlet port 44, and may be connected to the outlet port 104 of the control valve assembly 100. Before turning on the source of breathable gas, the user can inhale ambient air through the ambient air inlet port 204. As shown in FIG. 20, if the option of breathing ambient air is not required, or is indeed hazardous, the blanking plug 212 can be threaded into the ambient air inlet port 204 to seal it.

Figure 21:
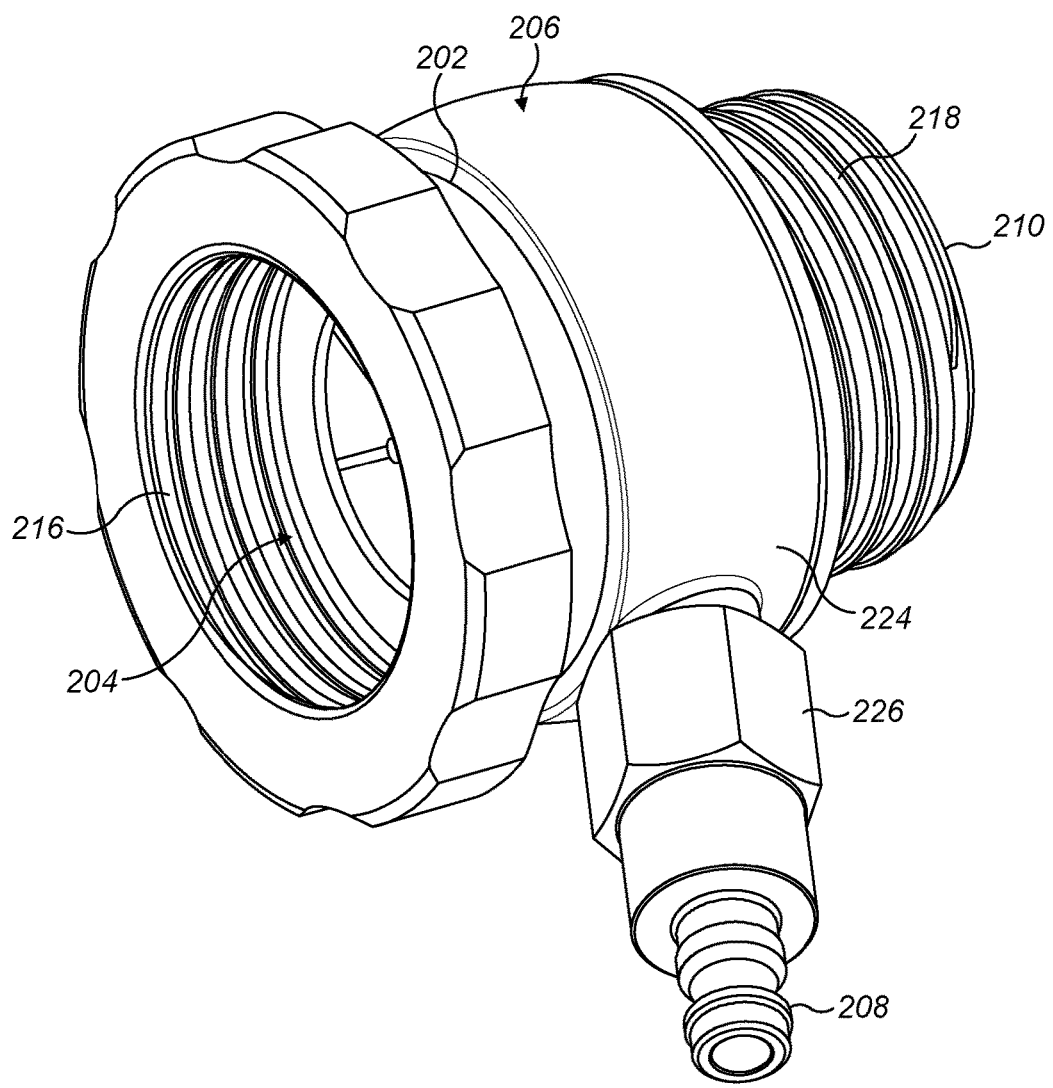
FIG. 21 schematically shows the adapter of FIG. 16 with the rotatable part rotated to a different angular position.

As shown in FIG. 21, for comfort and safety reasons, the angular position of the pressurised gas inlet port 208 can be adjusted by rotating the rotatable part 206 with respect to the adapter body 202. The indexing feature comprising the recesses 222 and projections 232 define a discrete number of angular positions, but the adapter 200 is configured to ensure that the pressurised gas inlet port 208 is always in fluid communication with the adapter chamber 214 regardless of the angular position of the rotatable part 206.

When it is desired to breathe pressurised gas from the source of breathable gas, the supply can be turned on. It may be possible to turn on the source of breathable gas such that pressurised gas is continuously supplied to the pressurised gas inlet port 208 at a fixed pressure, such as 2.5 bar, and at a flow rate of between 170 liters/minute and 350 liters/minute, for example. The pressurised gas flows through the pressurised gas inlet port 208, through the passageway 228 in the stem 226 and into the annular fluid channel 219 formed in the adapter body 202. The gas then flows through the passageways 220 in the adapter body 202 and into the adapter chamber 214 where it can be inhaled through the adapter outlet port 210. The pressurised gas is above atmospheric pressure and therefore acts on the one-way diaphragm valve 236 to keep it in a closed position. This prevents the supplied pressurised gas from exiting through the ambient air inlet port 204, and also ensures that no ambient air can be inhaled through the ambient air inlet port 204. This may be particularly important if the ambient atmosphere is contaminated.

Figure 22:
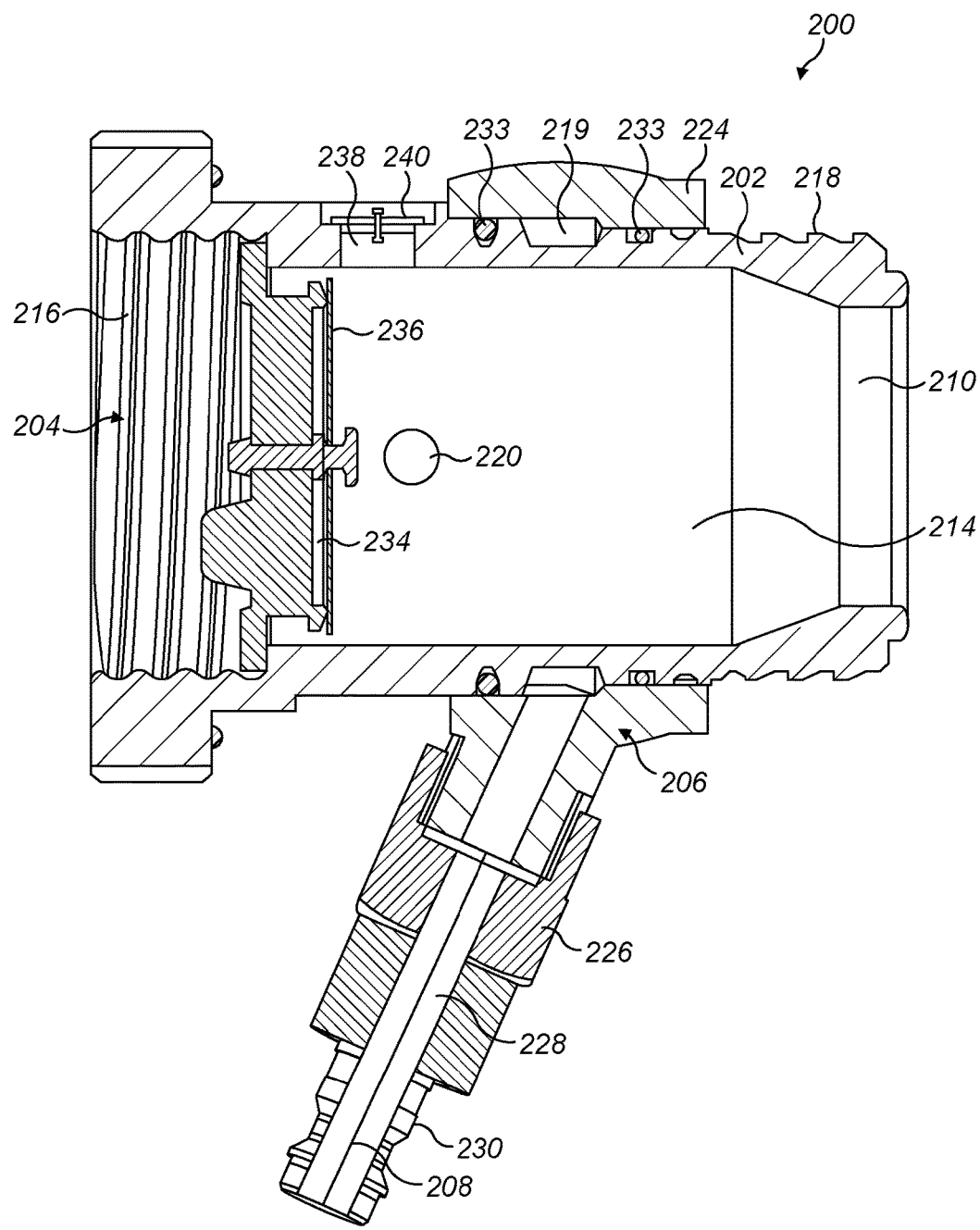
FIG. 22 schematically shows a cross-sectional view through an adapter according to a second embodiment.

FIG. 22 shows a second alternative embodiment of the adapter 200 in which an excess flow passageway 238 is provided that extends through the adapter body 202 and opens into the adapter chamber 214 downstream from the filter 234 and valve 236. Disposed within the excess flow passageway 238 is a one-way diaphragm excess flow valve 240. In use, if the pressure within the adapter chamber 214 and the mask (or hood) is too great then the excess flow valve 240 will open causing excess pressurised gas to vent to the atmosphere. Although excess gas can typically vent to the atmosphere through the mask or hood, if the gas flow rate is particularly high, when the user exhales the excess gas will not be able to be vented through the mask or hood. Therefore, the adapter 200 provides this beneficial feature.

Figure 23:
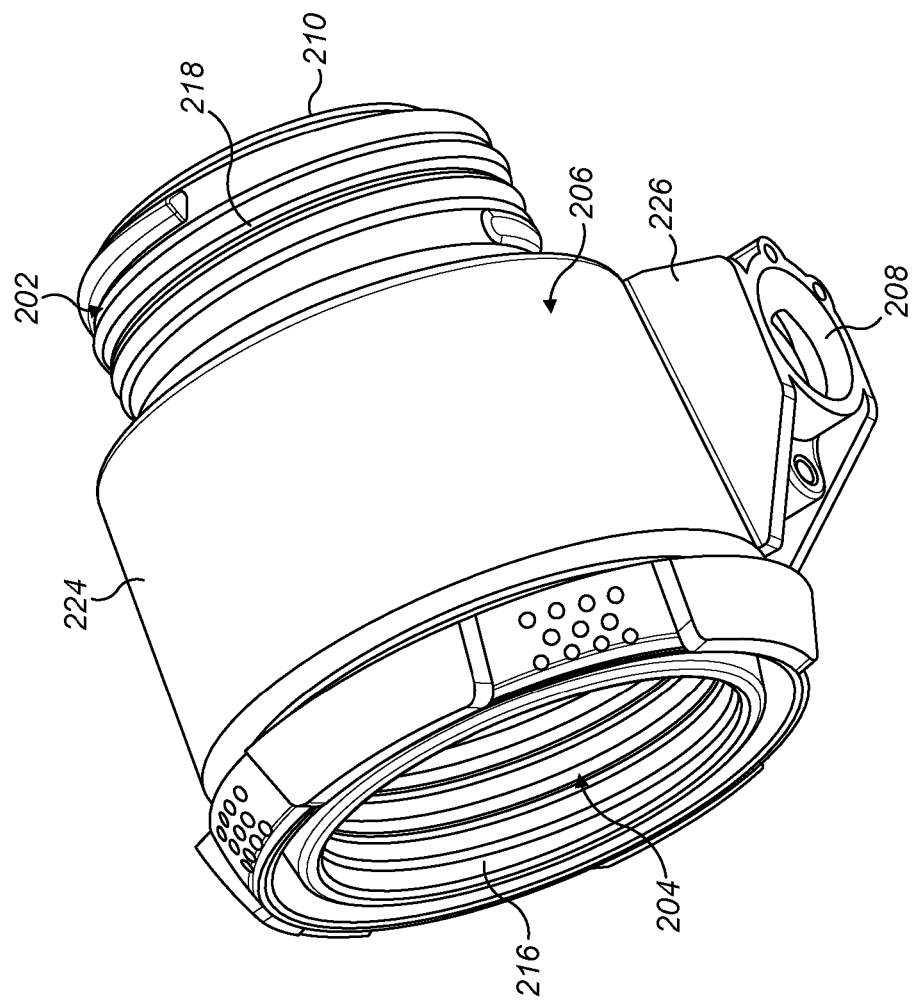
FIG. 23 schematically shows a perspective view of an adapter suitable for use with a constant flow delivery device according to a third embodiment.
Figure 23:
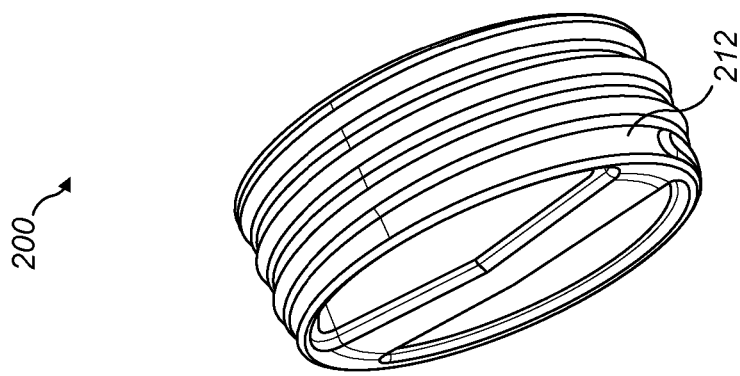

FIG. 23 schematically shows a third embodiment of the adapter 200 which is similar to the first and second embodiments. As for the first and second embodiments, the adapter 200 comprises an adapter body 202, an ambient air inlet port 204, a rotatable part 206 having a pressurised gas inlet port 208, a threaded adapter outlet port 210 and a blanking plug 212.

Figure 24:
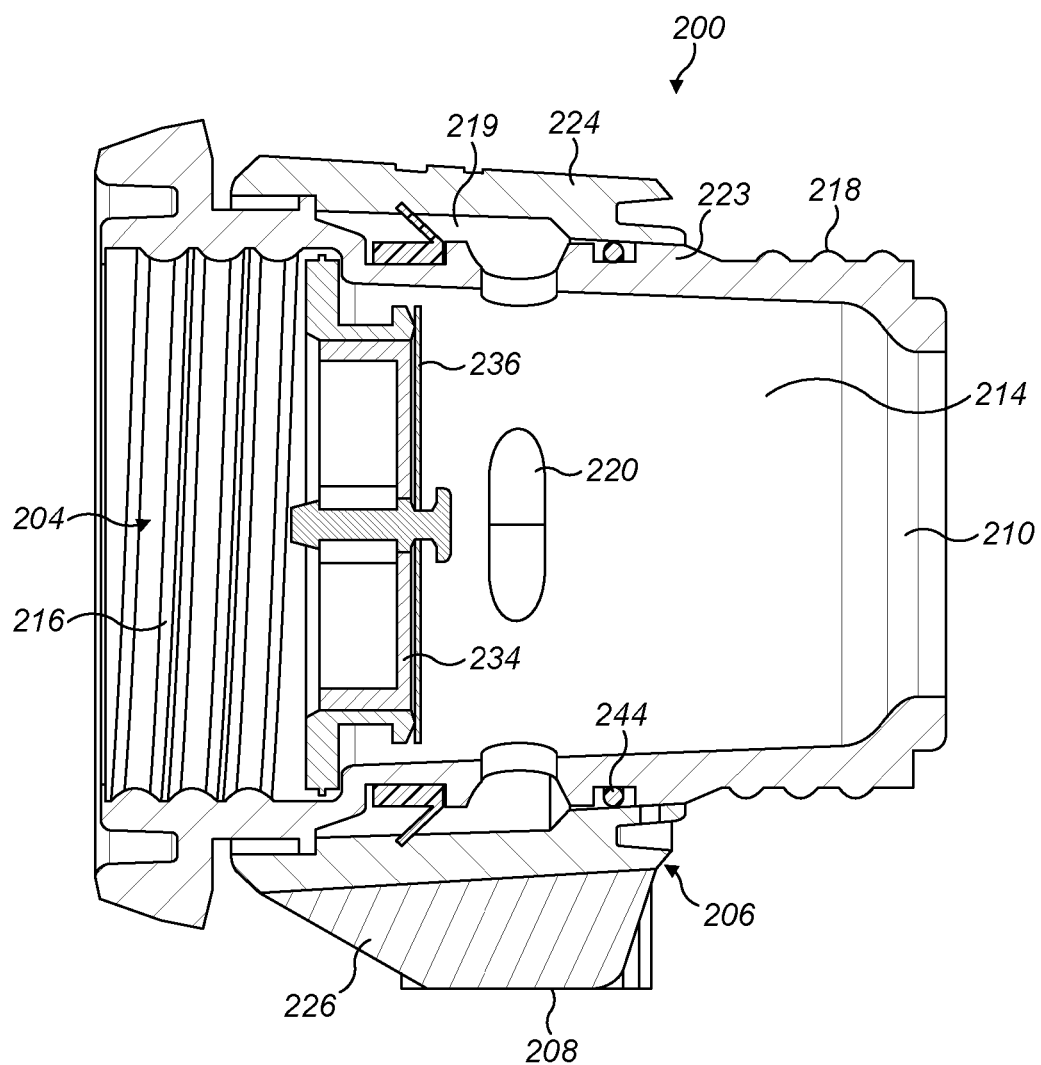
FIG. 24 schematically shows a cross-sectional view through the adapter of FIG. 23.
Figure 25:
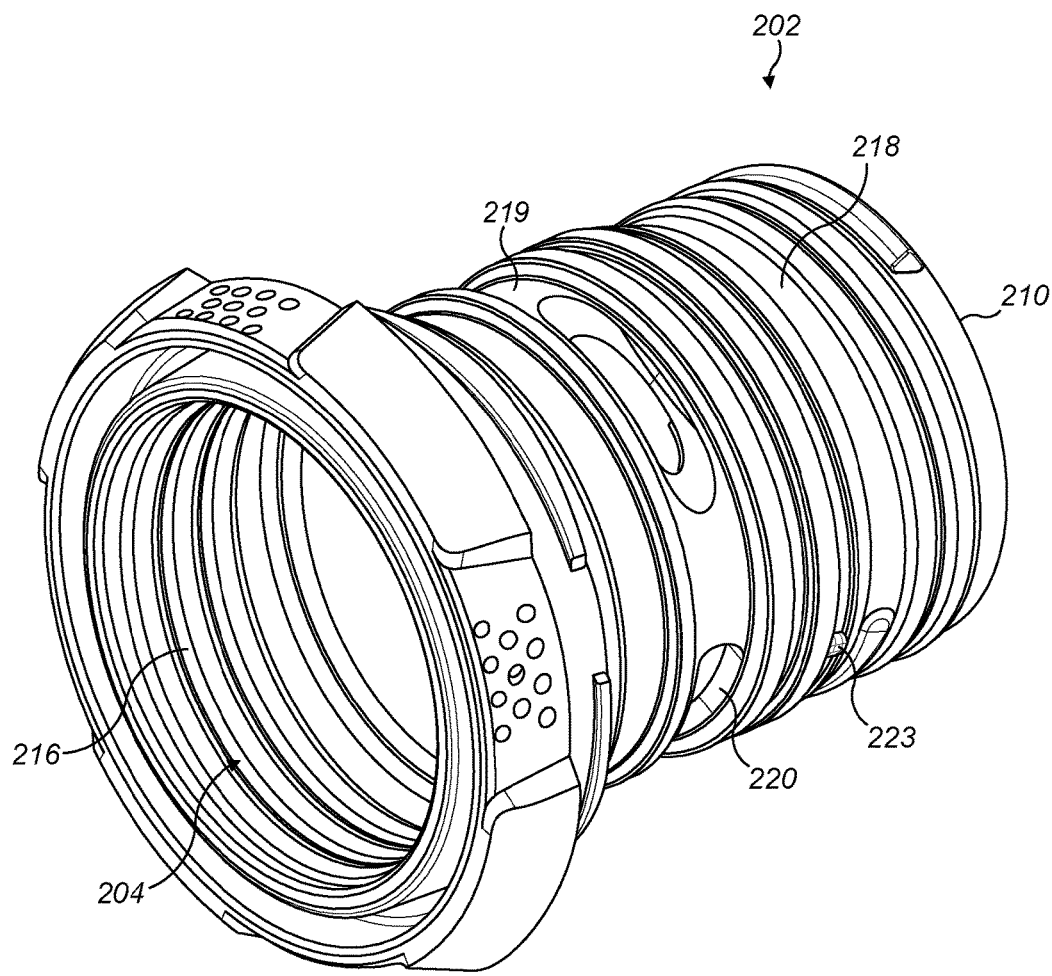
FIG. 25 schematically shows a perspective view of the adapter body of the adapter of FIG. 23.

Referring now to FIGS. 24 and 25, as for the first and second embodiments, the adapter body 202 is generally cylindrical and defines an adapter chamber 214. The first and second ends of the adapter body 202 are open and form the ambient air inlet 204 and adapter outlet port 210 respectively. The inner surface of the adapter body 202 at the first end is threaded 216 for cooperation with the threaded blanking plug 212, and the outer surface of the second end of the adapter body 202 is also threaded and forms an adapter connector 218 which allows the adapter 200 to be threadedly attached to a breathable gas delivery device. The outer surface of the adapter body 202 is provided with an annular fluid channel 219 within which four fluid passageways 220 are provided which are uniformly circumferentially spaced around the annular channel 219. The passageways 220 are in the form of elongate holes which extend through the wall of the adapter body 202 into the adapter chamber 214. A second annular channel is provided within which two diametrically opposite projections 223 are provided. These projections 223 form part of an indexing feature. As for the first and second embodiment, disposed within the adapter chamber 214 is a filter 234 and a one-way diaphragm valve 232 disposed between the ambient air inlet port 204 and the adapter chamber 214.

Figure 26:
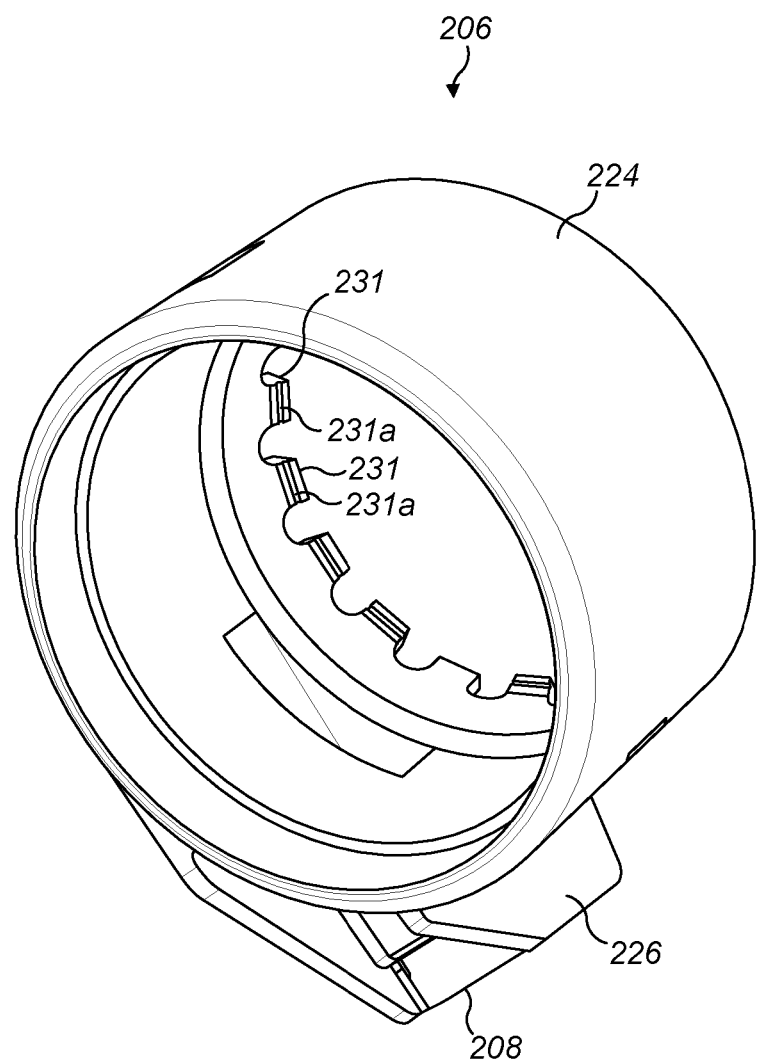
FIG. 26 schematically shows a perspective view of the rotatable part of the adapter of FIG. 23.

Referring now also to FIG. 26, the rotatable part 206 comprises an annular member 224 having an inner diameter comparable to the outer diameter of the adapter body 202 and a socket body 226 which extends away from the annular member 224 in a direction that is perpendicular to the centreline of the annular member 224 and offset from it. The socket body 226 is hollow and forms a fluid passageway which is open at the inner surface on the annular member 224. The end of the socket body 226 is open and provides the pressurised gas inlet port 208. A flexible conduit carrying pressurised breathable gas can be secured within the socket body 226. The end of the annular member 224 is provided with a plurality of, in this case 18, teeth 231 which are circumferentially and equally spaced such that there is a gap 235 (or recess) between adjacent teeth. Each tooth 231 (with the exception of every sixth tooth) comprises an inwardly extending radial projection 231a. The teeth 231 cooperate with the projections 223 formed on the adapter body 202 to provide an indexing feature.

Referring back to FIG. 24, the rotatable part 206 is rotatably mounted to the adapter body 202 with the annular member 224 surrounding the generally cylindrical adapter body 202. The rotatable part 206 is located such that the passageway of the socket body 226 is axially aligned with the annular fluid channel 219 which ensures that the pressurised gas inlet port 208 is in fluid communication with the adapter chamber 214 through the fluid passageways 220 regardless of the angular position of the rotatable part. Also, the rotatable part 206 is located such that the two projections 223 formed in the outer surface of the adapter body 202 are axially aligned with the teeth projections 231a of the annular member 224. The rotatable part 206 can be rotated to a plurality of, in this case 18, discrete angular positions so as to change the position of the pressurised gas inlet port 208, whilst ensuring fluid communication between the pressurised gas inlet port 208 and the adapter chamber 214. The plurality of discrete angular positions are defined by the angular spacing of the teeth 231. At each discrete angular position at least one of the projections 223 is disposed within the gap 235 between the teeth projections 231a of adjacent teeth 231. The gaps (or recesses) 235 between the teeth 231 therefore engage with the projections 223 to inhibit the rotational movement of the rotatable part 206 away from that angular position. However, by applying a sufficiently large rotational force, at least one tooth 231 resiliently deforms radially outwardly, thereby allowing the tooth projection 231a to ride over the projections 223. This indexing feature allows the rotatable part 206 to be temporarily locked in one of a number of angular positions, whilst allowing the angular position of the rotatable part 206 to be easily adjusted.

Figure 27:
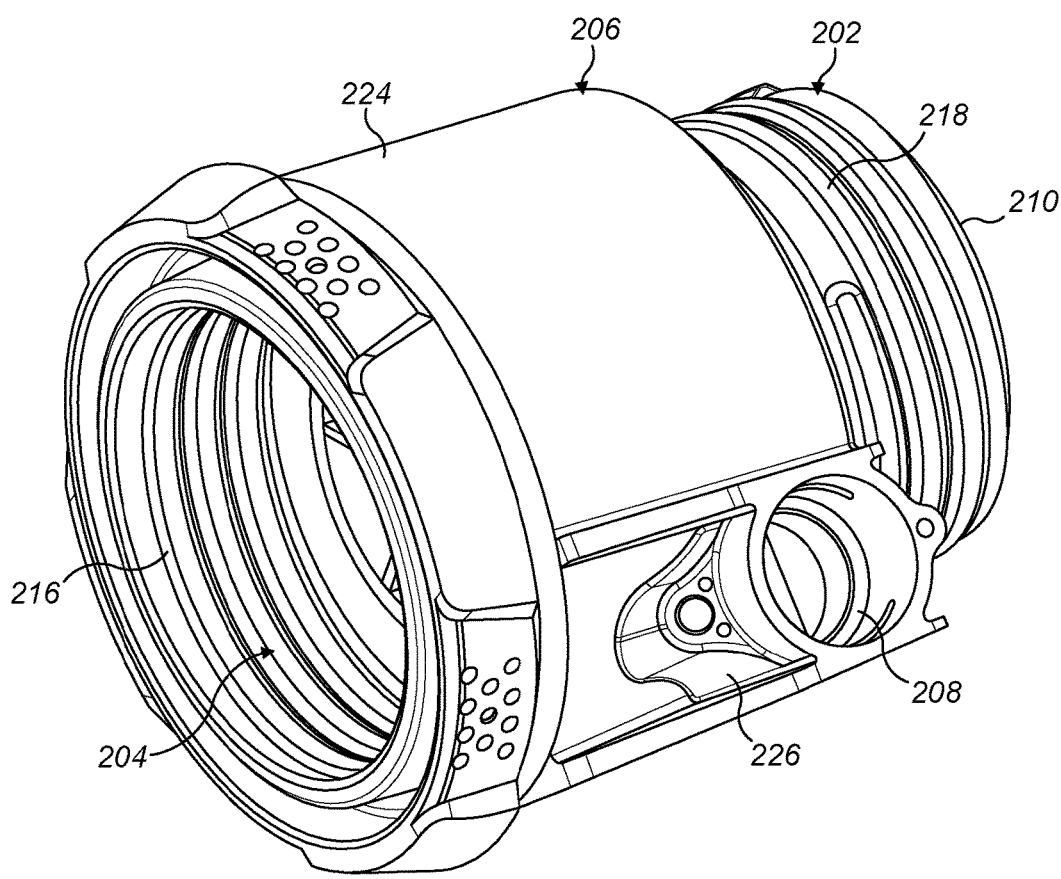
FIG. 27 schematically shows the adapter of FIG. 23 with the rotatable part rotated to a different angular position.

As for the first and second embodiments, in use, the adapter 200 is connected to a breathable gas delivery device, such as a mask, with the adapter connector 230 threaded into the gas inlet port of the mask. A pressurised source of breathable gas, such as a compressed air network (or ring main), is connected to the pressurised gas inlet port 208 of the adapter 200 using a flexible conduit. Before turning on the source of breathable gas, the user can inhale ambient air through the ambient air inlet port 204. As shown in FIG. 27, for comfort and safety reasons, the angular position of the pressurised gas inlet port 208 can be adjusted by rotating the rotatable part 206 with respect to the adapter body 202. The indexing feature comprising the teeth 231 defining the gaps/recesses 235 and the projections 223 define a discrete number of angular positions.

Figure 28:
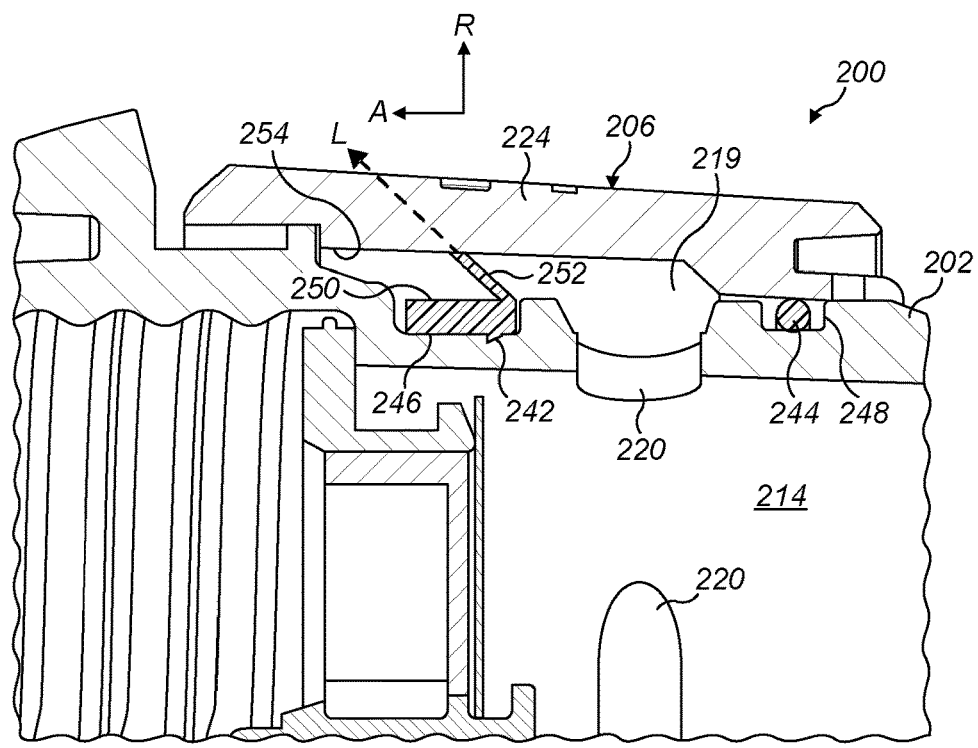
FIG. 28 schematically shows a close-up of the sealing arrangement.

As best shown in FIG. 28, the adapter 200 is provided with a sealing arrangement for sealing between the adapter body 202 and the annular member 224 of the rotatable part 206. The sealing arrangement comprises an annular lip seal 242 and an o-ring 244 that are disposed between the adapter body 202 and the annular member 224. In other embodiments both seals 242, 244 could be lip seals. The seals 242, 244 are located in respective annular grooves or channels 246, 248 provided in the outer surface of the adapter body 202. In other embodiments, the seals 242, 244 could be located in grooves or channels formed in the inner surface of the annular member 224. The seals 242, 244 are located either side of the fluid passageways 220 and the annular fluid channel 219. The sealing arrangement therefore allows the rotatable part 206 to be rotated with respect to the adapter body 202, whilst ensuring fluid communication between the annular fluid channel 219 and the adapter chamber 214, but preventing undesirable fluid leakage from between the two components 202, 224.

The lip seal 242 is integrally formed from a resilient material such as a synthetic rubber and comprises a main ring portion 250 and a lip portion 252. The lip portion 252 extends away from the main ring portion 250 in a direction L that is inclined (oblique) to the radial direction R and the axial direction A. The direction of extent of the lip portion 252 therefore has both a radial and an axial component. The lip seal 242 is mounted to the adapter body 202 with the main ring portion 250 disposed in the annular groove 246 such that the lip portion 252 extends in a direction L that is away from the fluid passageway 220 and the annular fluid channel 219. It therefore extends in a direction L away from the pressure side (i.e. the axial component of the direction of extent is away from the pressure side). The outer tip of the lip portion 252 abuts or seals against a sealing surface 254 which in this embodiment is the inner surface of the annular member 224. The o-ring 244 also seals against this sealing surface 244.

Figure 29:
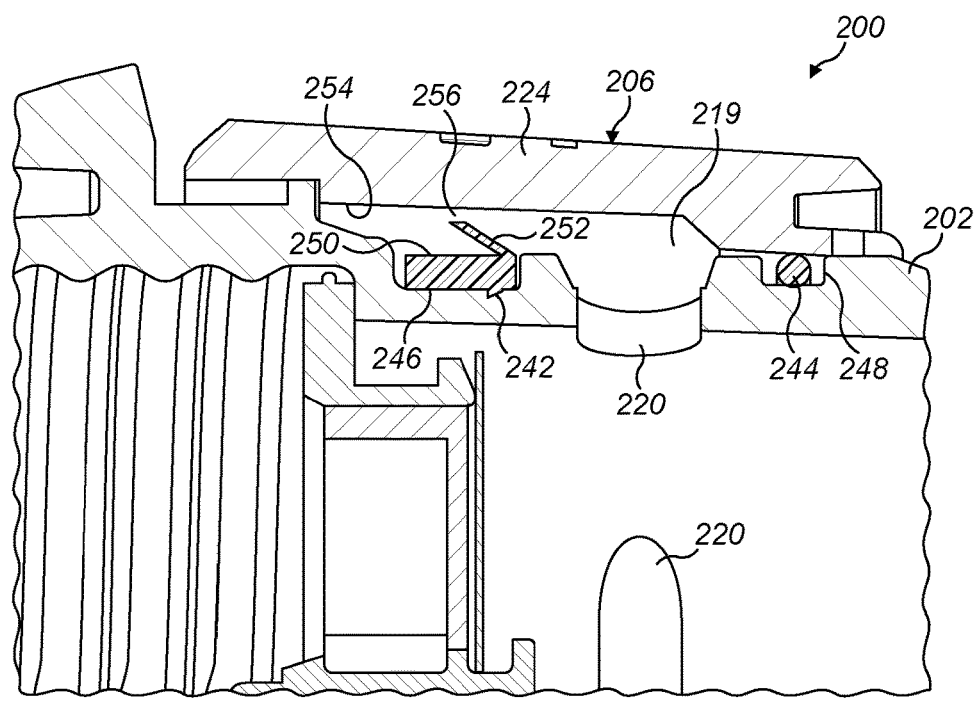
FIG. 29 schematically shows a close-up of the sealing arrangement with the lip portion of the lip seal deflected.

Advantageously, in this embodiment, the sealing arrangement provides the functionality of an excess flow valve. In use, exhaled or excess gas is typically vented to the atmosphere through the mask or hood. However, if the pressurised gas flow rate is particularly high, when the user exhales, not all of the excess gas is able to be vented through the mask or hood. As shown in FIG. 29, if the pressure within the adapter chamber 214 and the mask (or hood) is too great, the pressure acts of the inner surface of the lip portion 252 of the lip seal 242 to resiliently deflect it (towards the axial direction) so that the tip of the lip portion 252 moves away from the sealing surface 254. This forms an excess flow passageway 256 between the lip seal 242 and the sealing surface 254. This allows excess gas within the adapter chamber 214 to vent to the atmosphere between the tip of the lip portion 252 and the sealing surface 254. When the pressure within the adapter chamber 214 drops again, the lip portion 252 moves back such that the tip of the lip portion 252 once again seals against the sealing surface 254. The lip seal 242 also prevents gas flowing into the adapter chamber 214 from the outside. For example, if the gas pressure outside the adapter chamber 214 is greater than the pressure within the adapter chamber 214, the pressure acts on the outside surface of the lip portion 252 which pushes the tip of the lip portion 252 against the sealing surface 254. The improves the seal provided by the sealing arrangement.

Although it has been described that the adapter 200 could be used with the manifold 40 and/or the control valve 100, it should be appreciated that it could be used with any source of pressurised breathable gas.

Further, the indexing feature provided between the adapter body 202 and the rotatable part 206 could be used with any rotatable fluid coupling (such as banjo fittings) in order to provide indexing. For example, the banjo fitting of FIG. 9 could be provided with the indexing feature of the adapter 200 such that it can be rotated to a plurality of discrete angular positions. Of course it should also be appreciated that the adapter 200 need not necessarily be provided with an indexing feature, or indeed the position of the pressurised gas inlet port could be fixed.

Although the invention has been described in terms of exemplary embodiments, it is not limited thereto. Rather, the appended claims should be construed broadly to include other variants and embodiments of the invention which may be made by those skilled in the art without departing from the scope and range of equivalents of the invention. This disclosure is intended to cover any adaptations or variations of the embodiments discussed herein.

The invention claimed is:

1. A fluid adapter for a breathable gas delivery device for delivering breathable gas to a user, the breathable gas delivery device having a delivery device gas inlet port having a coupling, the fluid adapter comprising:
   an adapter body defining an adapter chamber with at least one fluid passageway extending through the adapter body into the adapter chamber;
   an ambient air inlet port arranged to provide fluid communication between the adapter chamber and ambient air outside of the fluid adapter;
   an adapter outlet port formed by the adapter body and in fluid communication with the adapter chamber, the adapter outlet port having a coupling formed by the adapter body, wherein the coupling is arranged to cooperate with the coupling of the gas inlet port of a breathable gas delivery device such that the adapter outlet port is fluidically coupled to the delivery device gas inlet port and such that the fluid adapter is physically coupled to the breathable gas delivery device;
   a one-way valve disposed within the adapter body between the ambient air inlet port and the adapter chamber, wherein the one-way valve is arranged so as to permit fluid flow into the adapter chamber through the ambient air inlet port but restrict or prevent fluid flow out of the adapter chamber through the ambient air inlet port;
   a rotatable part comprising:
      an annular member; and
      a pressurised gas inlet port arranged to be fluidically coupled to a source of pressurised breathable gas;
      wherein the rotatable part is rotatably coupled to the adapter body with the annular member surrounding the adapter body such that the rotatable part can be rotated to a plurality of discrete angular positions which are defined by an indexing feature; and
      wherein in each of the discrete angular positions the pressurised gas inlet port is in fluid communication with the adapter chamber through the at least one fluid passageway, and
      wherein the adapter body has a generally cylindrical outer wall portion through which the at least one fluid passageway extends into the adapter chamber, wherein the annular member surrounds the cylindrical outer wall portion.

2. Breathing apparatus equipment, comprising:
   a breathable gas delivery device arranged to be worn by a user for delivering breathable gas to the user, the delivery device having a delivery device gas inlet port having a coupling; and
   a fluid adapter in accordance with claim 1, wherein the coupling of the adapter outlet port is coupled to the coupling of the delivery device gas inlet port such that the adapter outlet port is fluidically coupled to the delivery device gas inlet port and such that the fluid adapter is physically coupled to the breathable gas delivery device.

3. A fluid adapter for a breathable gas delivery device for delivering breathable gas to a user, the fluid adapter comprising:
   an adapter body defining an adapter chamber with at least one fluid passageway extending through the adapter body into the adapter chamber;
   an ambient air inlet port arranged to provide fluid communication between the adapter chamber and ambient air outside of the fluid adapter;
   an adapter outlet port in fluid communication with the adapter chamber and arranged to be fluidically coupled to a delivery device gas inlet port of the breathable gas delivery device;
   an adapter connector arranged to connect the fluid adapter to the breathable gas delivery device such that the adapter outlet port is fluidically coupled to the delivery device gas inlet port; and
   a rotatable part comprising an annular member and a pressurised gas inlet port arranged to be fluidically coupled to a source of pressurised breathable gas, the rotatable part being rotatably coupled to the adapter body with the annular member surrounding the adapter body such that the rotatable part can be rotated to a plurality of angular positions with respect to the adapter body so as to alter the position of the pressurised gas inlet port, wherein in each of the angular positions the pressurised gas inlet port is in fluid communication with the adapter chamber through the at least one fluid passageway; and
   wherein the adapter body has a generally cylindrical outer wall portion through which the at least one fluid passageway extends into the adapter chamber, wherein the annular member surrounds the cylindrical outer wall portion.

4. A fluid adapter according to claim 3, further comprising a valve disposed between the ambient air inlet port and the adapter chamber.

5. A fluid adapter according to claim 3, further comprising a blanking plug that is located or is arranged to be located within the ambient air inlet port so as to prevent fluid flow through the ambient air inlet port.

6. A fluid adapter according to claim 3, further comprising an excess flow valve which is arranged to open and close in response to the pressure within the adapter chamber so as to vent gas within the adapter chamber to the atmosphere.

7. A fluid adapter according to claim 6, further comprising an excess flow passageway extending through the adapter body into the adapter chamber, wherein the excess flow valve is arranged to control the flow of gas through the excess flow passageway.

8. A fluid adapter according to claim 6, wherein the excess flow valve is resiliently biased to a closed position and is arranged to move to an open position when the pressure within the adapter chamber is above a threshold.

9. A fluid adapter according to claim 3, wherein the adapter connector comprises a threaded adapter outlet port, a snap-fit adapter outlet port or a press-fit adapter outlet port.

10. A fluid adapter according to claim 3, further comprising an indexing feature defining a plurality of discrete angular positions to which the rotatable part can be rotated with respect to the adapter body.

11. A fluid adapter according to claim 10, wherein the indexing feature comprises a plurality of circumferentially spaced first formations formed on either the adapter body or the rotatable part and at least one corresponding second formation formed on the other of the adapter body and the rotatable part, wherein first and second formations are arranged to engage with one another at each of the plurality discrete angular positions.

12. A fluid adapter according to claim 10, wherein the indexing feature inhibits the movement of the rotatable part away from a particular discrete angular position.

13. A fluid adapter according to claim 3, further comprising a sealing arrangement sealing between the adapter body and the annular member.

14. A fluid adapter according to claim 13, wherein the sealing arrangement comprises first and second seals disposed on first and second sides of the at least one fluid passageway.

15. A fluid adapter according to claim 13, wherein the sealing arrangement comprises at least one lip seal having a lip portion which seals against a sealing surface formed by either the adapter body or the annular member.

16. A fluid adapter according to claim 15, wherein the lip seal is configured such that a pressure within the adapter chamber above a threshold causes the lip portion to resiliently deflect away from the sealing surface, thereby allowing gas within the adapter chamber to be vented out of the adapter chamber.

17. Breathing apparatus equipment, comprising:
a breathable gas delivery device for delivering breathable gas to a user and having a delivery device gas inlet port; and
a fluid adapter in accordance with claim 3;
wherein the adapter connector connects the fluid adapter to the breathable gas delivery device such that the adapter outlet port is fluidically coupled to the delivery device gas inlet port.

18. Breathing apparatus equipment according to claim 17, wherein the breathable gas delivery device is a facemask or a hood or a protection suit.

19. Breathing apparatus, comprising:
a manifold having a manifold inlet port for a source of breathable gas and at least one manifold outlet port;
a strap arranged to be worn by the user;
a holder coupled to the strap and to which the manifold is attached;
breathing apparatus equipment in accordance with claim 17 with a first flexible conduit fluidically coupled between the pressurised gas inlet port and the manifold outlet port; and
a source of pressurised breathable gas with a second flexible conduit fluidically coupled between the pressurised source of breathable gas and the manifold inlet port.

* * * * *